(12) United States Patent
Nakamaru

(10) Patent No.: US 9,479,690 B2
(45) Date of Patent: Oct. 25, 2016

(54) PHOTOGRAPHIC APPARATUS AND METHOD FOR FOCUSING CONTROL USING TWO HIGH PASS FILTERS

(71) Applicant: FUJIFILM Corporation, Tokyo (JP)

(72) Inventor: Fumio Nakamaru, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/010,760

(22) Filed: Jan. 29, 2016

(65) Prior Publication Data

US 2016/0150152 A1 May 26, 2016

Related U.S. Application Data

(63) Continuation of application No. PCT/JP2014/069175, filed on Jul. 18, 2014.

(30) Foreign Application Priority Data

Aug. 1, 2013 (JP) ................................. 2013-160395

(51) Int. Cl.
*H04N 5/232* (2006.01)
*G06K 9/46* (2006.01)
(Continued)

(52) U.S. Cl.
CPC .......... *H04N 5/23212* (2013.01); *G02B 7/365* (2013.01); *G03B 3/10* (2013.01);
(Continued)

(58) Field of Classification Search
USPC ................................................. 348/345–357
See application file for complete search history.

(56) References Cited

U.S. PATENT DOCUMENTS

2004/0227843 A1* 11/2004 Watanabe .......... H04N 5/23212
                                                                348/354
2008/0297648 A1* 12/2008 Furuki ..................... G02B 7/38
                                                                348/345
(Continued)

FOREIGN PATENT DOCUMENTS

JP     2007-67862 A      3/2007
JP     2009-237327 A    10/2009
(Continued)

OTHER PUBLICATIONS

English translation of Written Opinion of the International Search Authority (Form PCT/ISA/237) dated Oct. 28, 2014, issued in PCT/JP2014/069175.
(Continued)

*Primary Examiner* — Shahbaz Nazrul
(74) *Attorney, Agent, or Firm* — Birch, Stewart, Kolasch & Birch, LLP

(57) ABSTRACT

A digital camera is provided with a frequency component extraction unit, an AR evaluation value acquisition unit, a variation calculation unit, and a moving speed control unit. The frequency component extraction unit has first and second filters, and extracts first and second spatial frequency components. The AF evaluation value acquisition unit integrates the first and second spatial frequency components to acquire first and second AF evaluation values. The variation calculation unit calculates a first variation corresponding to first-order differentiation of the first AF evaluation value, a second variation corresponding to first-order differentiation of the second AF evaluation value, and a third variation corresponding to second-order differentiation of the second AF evaluation value. The moving speed control unit controls the moving speed of a focus lens at the time of an AF operation based on the rates of increase or decrease of the first to third variations.

6 Claims, 23 Drawing Sheets

(51) Int. Cl.
  *G02B 7/36*   (2006.01)
  *G03B 3/10*   (2006.01)
  *G03B 13/36*  (2006.01)
  *G06K 9/00*   (2006.01)
  *G06K 9/52*   (2006.01)

(52) U.S. Cl.
  CPC ........... *G03B 13/36* (2013.01); *G06K 9/4661* (2013.01); *G06K 9/00228* (2013.01); *G06K 9/00684* (2013.01); *G06K 9/522* (2013.01)

(56) References Cited

U.S. PATENT DOCUMENTS

| | | | | |
|---|---|---|---|---|
| 2009/0322936 | A1* | 12/2009 | Liaw | H04N 5/23212 348/354 |
| 2011/0228053 | A1* | 9/2011 | Aoki | H04N 5/23212 348/49 |
| 2011/0249150 | A1* | 10/2011 | Shintani | H04N 5/23212 348/240.3 |
| 2011/0261251 | A1* | 10/2011 | Okamoto | G02B 7/102 348/345 |
| 2012/0057069 | A1 | 3/2012 | Yamasaki | |
| 2014/0293117 | A1* | 10/2014 | Murakami | G02B 21/365 348/349 |
| 2015/0092098 | A1* | 4/2015 | Konishi | H04N 5/2352 348/333.11 |
| 2015/0215517 | A1* | 7/2015 | Kusaka | G02B 7/282 348/353 |

FOREIGN PATENT DOCUMENTS

| | | |
|---|---|---|
| JP | 2012-103708 A | 5/2012 |
| JP | 2014-38291 A | 2/2014 |
| WO | WO 2010/050200 A1 | 5/2010 |

OTHER PUBLICATIONS

International Search Report for PCT/JP2014/069175 mailed on Oct. 28, 2014.
Written Opinion of the International Searching Authority for PCT/JP2014/069175 mailed on Oct. 28, 2014.

* cited by examiner

| | $RV_1(x)$ | $RV_2(x)$ | $RV_3(x)$ | SPEED SP |
|---|---|---|---|---|
| TB | 0 | 0 | 0 | H |
| | | | + | H |
| | | | − | H |
| | | + | 0 | H |
| | | | + | H |
| | | | − | M |
| | | − | 0 | L |
| | | | + | L |
| | | | − | L |
| | + | 0 | 0 | H |
| | | | + | H |
| | | | − | H |
| | | + | 0 | H |
| | | | + | H |
| | | | − | M |
| | | − | 0 | L |
| | | | + | L |
| | | | − | L |
| | − | 0 | 0 | L |
| | | | + | L |
| | | | − | L |
| | | + | 0 | L |
| | | | + | L |
| | | | − | L |
| | | − | 0 | L |
| | | | + | L |
| | | | − | L |

FIG. 9

| RV₁(x) | RV₂(x) | RV₃(x) | SPEED SP |
|---|---|---|---|
| 0 | 0 | 0 | H |
|   |   | + | H |
|   |   | − | H |
|   | + | 0 | H |
|   |   | + | H |
|   |   | − | M |
|   | − | 0 | L |
|   |   | + | L |
|   |   | − | L |
| + | 0 | 0 | H |
|   |   | + | H |
|   |   | − | H |
|   | + | 0 | H |
|   |   | + | H |
|   |   | − | M |
|   | − | 0 | L |
|   |   | + | L |
|   |   | − | L |
| − | 0 | 0 | L |
|   |   | + | L |
|   |   | − | L |
|   | + | 0 | L |
|   |   | + | L |
|   |   | − | L |
|   | − | 0 | L |
|   |   | + | L |
|   |   | − | L |

TB1

| RV₁(x) | RV₂(x) | RV₃(x) | SPEED SP |
|---|---|---|---|
| 0 | 0 | 0 | H |
|   |   | + | H |
|   |   | − | H |
|   | + | 0 | H |
|   |   | + | H |
|   |   | − | M |
|   | − | 0 | L |
|   |   | + | L |
|   |   | − | L |
| + | 0 | 0 | H |
|   |   | + | H |
|   |   | − | H |
|   | + | 0 | M |
|   |   | + | L |
|   |   | − | M |
|   | − | 0 | L |
|   |   | + | L |
|   |   | − | L |
| − | 0 | 0 | L |
|   |   | + | L |
|   |   | − | L |
|   | + | 0 | L |
|   |   | + | L |
|   |   | − | L |
|   | − | 0 | L |
|   |   | + | L |
|   |   | − | L |

| RV₁(x) | RV₂(x) | RV₃(x) | SPEED SP |
|---|---|---|---|
| 0 | 0 | 0 | H |
| | | + | H |
| | | − | H |
| | + | 0 | H |
| | | + | H |
| | | − | M |
| | − | 0 | L |
| | | + | L |
| | | − | L |
| + | 0 | 0 | H |
| | | + | H |
| | | − | H |
| | + | 0 | H |
| | | + | H |
| | | − | M |
| | − | 0 | L |
| | | + | L |
| | | − | L |
| − | 0 | 0 | L |
| | | + | L |
| | | − | L |
| | + | 0 | L |
| | | + | L |
| | | − | L |
| | − | 0 | L |
| | | + | L |
| | | − | L |

TB1

| RV₁(x) | RV₂(x) | RV₃(x) | SPEED SP |
|---|---|---|---|
| 0 | 0 | 0 | H |
| | | + | H |
| | | − | H |
| | + | 0 | Ⓒ |
| | | + | H |
| | | − | M |
| | − | 0 | Ⓒ |
| | | + | Ⓒ |
| | | − | L |
| + | 0 | 0 | Ⓒ |
| | | + | Ⓒ |
| | | − | Ⓒ |
| | + | 0 | Ⓒ |
| | | + | H |
| | | − | M |
| | − | 0 | Ⓒ |
| | | + | Ⓒ |
| | | − | L |
| − | 0 | 0 | Ⓒ |
| | | + | Ⓒ |
| | | − | L |
| | + | 0 | Ⓒ |
| | | + | Ⓒ |
| | | − | Ⓒ |
| | − | 0 | L |
| | | + | Ⓒ |
| | | − | L |

| | | TB1 | | | | | TB2 | |
|---|---|---|---|---|---|---|---|---|
| RV$_1$(x) | RV$_2$(x) | RV$_3$(x) | SPEED SP | | RV$_1$(x) | RV$_2$(x) | RV$_3$(x) | SPEED SP |
| 0 | 0 | 0 | H | | 0 | 0 | 0 | H |
| | | + | H | | | | + | H |
| | | − | H | | | | − | (M) |
| | + | 0 | H | | | + | 0 | H |
| | | + | H | | | | + | H |
| | | − | M | | | | − | M |
| | − | 0 | L | | | − | 0 | L |
| | | + | L | | | | + | L |
| | | − | L | | | | − | L |
| + | 0 | 0 | H | | + | 0 | 0 | M |
| | | + | H | | | | + | M |
| | | − | H | | | | − | M |
| | + | 0 | H | | | + | 0 | M |
| | | + | H | | | | + | M |
| | | − | M | | | | − | L |
| | − | 0 | L | | | − | 0 | L |
| | | + | L | | | | + | L |
| | | − | L | | | | − | L |
| − | 0 | 0 | L | | − | 0 | 0 | L |
| | | + | L | | | | + | L |
| | | − | L | | | | − | L |
| | + | 0 | L | | | + | 0 | L |
| | | + | L | | | | + | L |
| | | − | L | | | | − | L |
| | − | 0 | L | | | − | 0 | L |
| | | + | L | | | | + | L |
| | | − | L | | | | − | L |

FIG. 19

PHOTOGRAPHIC APPARATUS AND METHOD FOR FOCUSING CONTROL USING TWO HIGH PASS FILTERS

CROSS-REFERENCE TO RELATED APPLICATIONS

This application is a Continuation of PCT International Application No. PCT/JP2014/069175 filed on Jul. 18, 2014, which claims priority under 35 U.S.C §119(a) to Japanese Patent Application No. 2013-160395 filed Aug. 1, 2013. The above application is hereby expressly incorporated by reference, in its entirety, into the present application.

BACKGROUND OF THE INVENTION

1. Field of the Invention

The present invention relates to a photographing method and apparatus which photographs an object while performing auto focus of a contrast system.

2. Description Related to the Prior Art

A photographing apparatus, such as a digital camera, includes a focus lens, a lens drive unit which moves the focus lens in an optical axis direction, and an imaging unit which images the object through the focus lens to generate image data. Such a photographing apparatus is normally provided with an auto focus (AF) function of automatically executing a focusing operation without any user operation. As the AF function, a contrast system in which a focal position where image contrast is the highest is detected while moving a focus lens is generally used.

The AF function of the contrast system is realized by a frequency component extraction unit, an AF evaluation value acquisition unit, and a focal position detection unit. The frequency component extraction unit extracts a predetermined spatial frequency component from each piece of image data, which is generated through imaging with an imaging unit at an interval of a predetermined time while moving the focus lens, using a high pass filter. The AF evaluation value acquisition unit integrates the extracted spatial frequency component to acquire an AF evaluation value representing contrast. The focal position detection unit detects the focal position of the focus lens searches by searching for a peak position of the AF evaluation value.

Since the peak of the AF evaluation value does not appear if the focus lens does not actually pass the focal position, when the moving speed of the focus lens is high, the moving pitch of the focus lens is great, and the focus lens may greatly depart from the focal position. In this case, as described in United States Patent Application Publication No. 2011/0261251 (corresponding to WO2010/050200A), after the focus lens passes through the focal position, the moving speed of the focus lens is changed to a low speed to reduce the moving pitch, whereby it is possible to detect the focal position with excellent accuracy. However, it takes a long time until the focus lens is returned to the focal position after greatly departing from the focal position.

In response to this problem, JP2012-103708A suggests that first and second AF evaluation values are acquired using a first high pass filter having a first cutoff frequency and a second high pass filter having a second cutoff frequency higher than the first cutoff frequency, and moving control of a focus lens is performed with the quotient obtained by dividing the first AF evaluation value by the second AF evaluation value as a parameter.

In this parameter, a peak appears at a position separated by a predetermined amount from the focal position. "Coarse adjustment" of the focus lens is performed from when the focus lens starts to move until the peak of the parameter is detected, and "fine adjustment" is performed after the peak is detected. Specifically, moving of the focus lens is temporarily stopped when the peak of the parameter is detected, and thereafter, moving of the focus lens is performed based on the second AF evaluation value. The first and second cutoff frequencies are set such that the peak position of the parameter becomes about twice the moving pitch of the focus lens from the focal position, whereby the time necessary for fine adjustment is reduced and the AF operation time is reduced.

However, in the photographing apparatus described in JP2012-103708A, while coarse adjustment is performed if moving of the focus lens is started and is changed to fine adjustment when the focus lens reaches a position separated by a predetermined amount from the focal position, at this time, control for the moving speed of the focus lens is not performed. For this reason, when the moving pitch of the focus lens is great, since the focus lens greatly departs from the focal position, the AF operation time is extended.

Furthermore, since the distance between the peak position of the parameter and the focal position depends on the first and second cutoff frequencies, in order to reduce the AF operation time, it is necessary to appropriately set the first and second cutoff frequencies. When this setting is not appropriate, the AF operation time is not reduced.

SUMMARY OF THE INVENTION

An object of the invention is to provide a photographing method and apparatus capable of easily reducing an AF operation time.

An object of the invention is to provide a photographing method and apparatus capable of easily reducing an AF operation time.

In order to attain the above-described object, an imaging apparatus of an aspect of the invention includes a focus lens, a lens drive unit, an imaging unit, a frequency component extraction unit, an AF evaluation value acquisition unit, an arithmetic unit, a variation calculation unit, a moving speed control unit, and a focal position detection unit. The lens drive unit moves the focus lens in an optical axis direction. The imaging unit images an object at an interval of a predetermined time through the focus lens moving in the optical axis direction, and generates a plurality of pieces of image data. The frequency component extraction unit extracts a spatial frequency component from each piece of image data using a first filter and a second filter as high pass filters. A cutoff frequency of the first filter is higher than a cutoff frequency of the second filter. The AF evaluation value acquisition unit integrates the spatial frequency component extracted by the first filter to acquire a first AF evaluation value, and integrates the spatial frequency component extracted by the second filter to acquire a second AF evaluation value. The arithmetic unit subtracts a value obtained by multiplying or adding a predetermined constant to the first AF evaluation value from the second AF evaluation value to calculate an arithmetic value. The variation calculation unit calculates a variation of the arithmetic value at an interval of the predetermined time. The moving speed control unit controls a moving speed of the focus lens by the lens drive unit based on the variation. The focal position detection unit detects a focal position of the focus lens based on at least one of the first AF evaluation value and the second AF evaluation value.

An imaging apparatus of another aspect of the invention includes a focus lens, a lens drive unit, an imaging unit, a frequency component extraction unit, an AF evaluation value acquisition unit, a variation calculation unit, a moving speed control unit, a focal position detection unit, a difference calculation unit, and a table storage unit. The lens drive unit moves the focus lens in an optical axis direction. The imaging unit images an object at an interval of a predetermined time through the focus lens moving in the optical axis direction, and generates a plurality of pieces of image data. The frequency component extraction unit extracts a spatial frequency component from each piece of image data using a first filter and a second filter as high pass filters. A cutoff frequency of the first filter is higher than a cutoff frequency of the second filter. The AF evaluation value acquisition unit integrates the spatial frequency component extracted by the first filter to acquire a first AF evaluation value, and integrates the spatial frequency component extracted by the second filter to acquire a second AF evaluation value. The variation calculation unit calculates at least a first variation corresponding to first-order differentiation of the first AF evaluation value and a second variation corresponding to first-order differentiation of the second AF evaluation value at an interval of the predetermined time. The moving speed control unit controls a moving speed of the focus lens by the lens drive unit based on the first variation and the second variation. The focal position detection unit detects a focal position of the focus lens based on at least one of the first AF evaluation value and the second AF evaluation value. The difference calculation unit calculates a difference between the first AF evaluation value and the second AF evaluation value. The table storage unit stores a plurality of tables defining at least a correspondence relationship between rates of increase or decrease of the first and second variations and the moving speed. The correspondence relationship is different according to the difference. The moving speed control unit selects a table corresponding to the difference calculated by the difference calculation unit from among the plurality of tables, and controls the moving speed of the focus lens by the lens drive unit based on the selected table.

The variation calculation unit preferably calculates a third variation corresponding to second-order differentiation of the second AF evaluation value at an interval of the predetermined time in addition to the first and second variations. The table storage unit preferably stores a plurality of tables in which the rates of increase or decrease of the first to third variations are associated with the moving speed.

An imaging apparatus of a further aspect of the invention includes a focus lens, a lens drive unit, an imaging unit, a frequency component extraction unit, an AF evaluation value acquisition unit, a variation calculation unit, a moving speed control unit, a focal position detection unit, a luminance detection unit, and a table storage unit. The lens drive unit moves the focus lens in an optical axis direction. The imaging unit images an object at an interval of a predetermined time through the focus lens moving in the optical axis direction, and generates a plurality of pieces of image data. The frequency component extraction unit extracts a spatial frequency component for each filter constituting a plurality of high pass filters using the plurality of high pass filters having different cutoff frequencies from each piece of image data. The AF evaluation value acquisition unit integrates the spatial frequency component extracted for each filter to acquire an AF evaluation value group composed of a plurality of AF evaluation values. The variation calculation unit calculates a variation of a value based on the AF evaluation value group at an interval of the predetermined time. The moving speed control unit controls a moving speed of the focus lens by the lens drive unit based on the variation. The focal position detection unit detects a focal position of the focus lens based on at least one AF evaluation value of the AF evaluation value group. The luminance detection unit detects a luminance of the object. The table storage unit stores a plurality of tables defining a correspondence relationship between rates of increase or decrease of the variations and the moving speed. The correspondence relationship is different according to the luminance. The moving speed control unit selects a table corresponding to the luminance detected by the luminance detection unit from among the plurality of tables, and controls the moving speed of the focus lens by the lens drive unit based on the selected table.

Preferably, the photographing apparatus further includes at least one pair of phase difference pixels provided in the imaging unit, and a phase difference focal position detection unit which detects the focal position with the phase difference pixels. The moving speed control unit preferably sets an initial speed for starting to move the focus lens to a predetermined value by the lens drive unit in the case where the distance between the position of the focus lens and the focal position detected by the phase difference focal position detection unit is equal to or greater than a predetermined value.

Preferably, each of the first filter and the second filter is a digital filter which subjects each piece of image data to a discrete cosine transformation process to extract the spatial frequency component.

According to the invention, since the variation of the value based on the AF evaluation value is calculated at an interval of the predetermined time, and the moving speed of the focus lens is controlled based on the calculated variation, it is possible to easily reduce an AF operation time.

BRIEF DESCRIPTION OF DRAWINGS

For more complete understanding of the present invention, and the advantage thereof, reference is now made to the subsequent descriptions taken in conjunction with the accompanying drawings, in which:

FIG. 9 is a diagram showing a table which is used in the second embodiment;

FIG. 11 is a diagram showing a table which is used in the third embodiment;

FIG. 15 is a diagram showing a table which is used in the fifth embodiment;

FIG. 19 is a diagram showing a table which is used in the seventh embodiment;

DESCRIPTION OF THE PREFERRED EMBODIMENTS

First Embodiment

Figure 1:
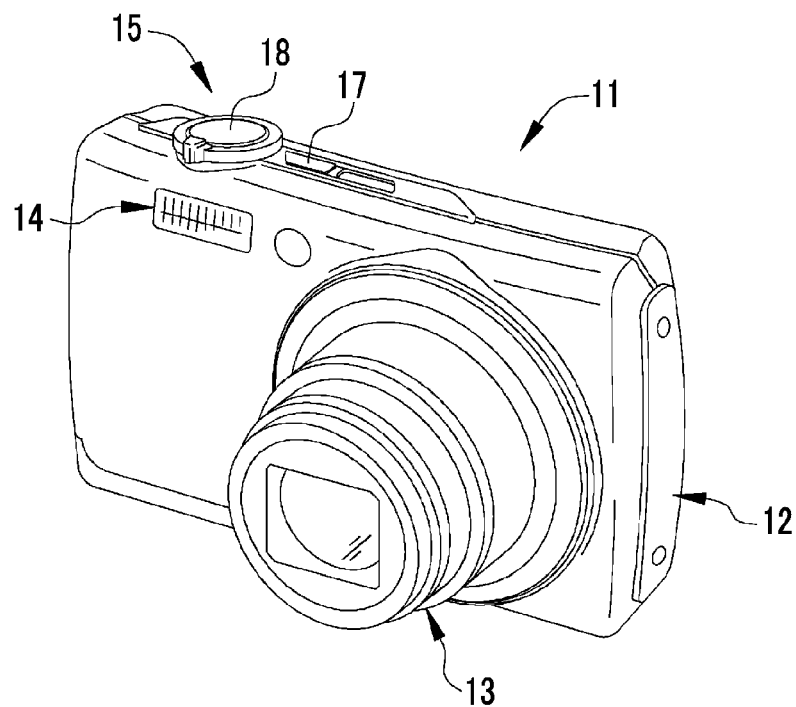
FIG. 1 is a front-side perspective view of a digital camera.
Figure 2:
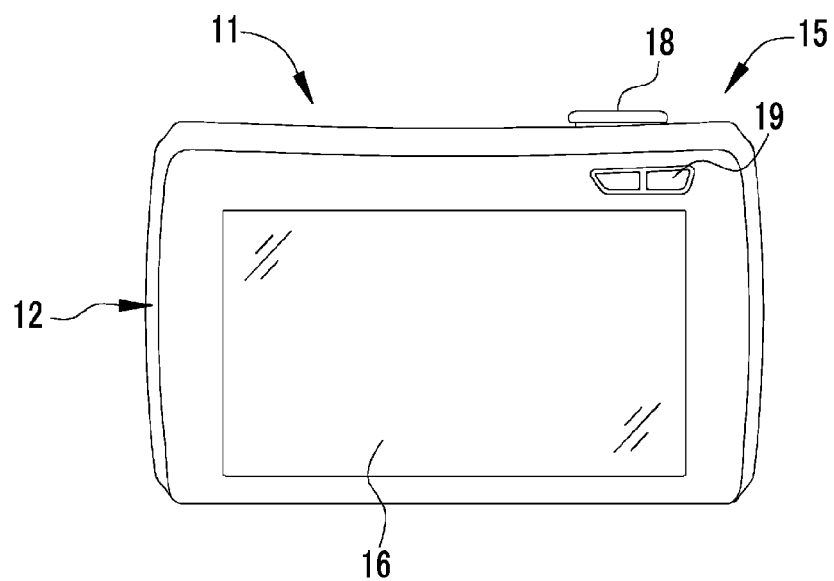
FIG. 2 is a rear view of the digital camera.

In FIGS. 1 and 2, a digital camera 11 includes a camera body 12, a lens barrel 13, a flash emission unit 14, an operating unit 15, and a display unit 16. The lens barrel 13 is provided on the front surface of the camera body 12. The flash emission unit 14 is provided on the front surface of the camera body 12, and emits a flash toward an object for photographing.

The operating unit 15 has a power button 17, a release button 18, a mode selection button 19, and the like, and is provided in the upper portion of the camera body 12. The power button 17 is operated for turning on/off a power supply (not shown) of the digital camera 11. The release button 18 is operated for executing photographing. The mode selection button 19 is operated for switching an operation mode of the digital camera 11. Various photographing scenes (indoor, figure, night view) can be set by the mode selection button 19 and the like.

The release button 18 has a two-stage stroke type switch (not shown) constituted of an S1 switch and an S2 switch. If the release button 18 is depressed (half-depressed) and the S1 switch is turned to an on state, the digital camera 11 performs a photographing preparation operation, such as an auto focus (AF) operation. If the release button 18 is further depressed (full-depressed) in this state, and the S2 switch is turned to an on state, a photographing operation is performed.

The operation mode of the digital camera 11 includes a still image photographing mode in which a still image is acquired, a moving image photographing mode in which a moving image is acquired, a reproduction mode in which each acquired image is reproduced and displayed on the display unit 16, and the like. The display unit 16 is constituted of a liquid crystal display or the like, and displays images acquired in various photographing modes, or a menu screen for performing various settings.

When the operation mode is set to the still image photographing mode or the moving image photographing mode, the display unit 16 displays a live view image until photographing is executed. The user can determine composition while observing the live view image displayed on the display unit 16.

The digital camera 11 is provided with a slot (not shown) into which a recording media 40 (see FIG. 3) described below is loaded.

Figure 3:
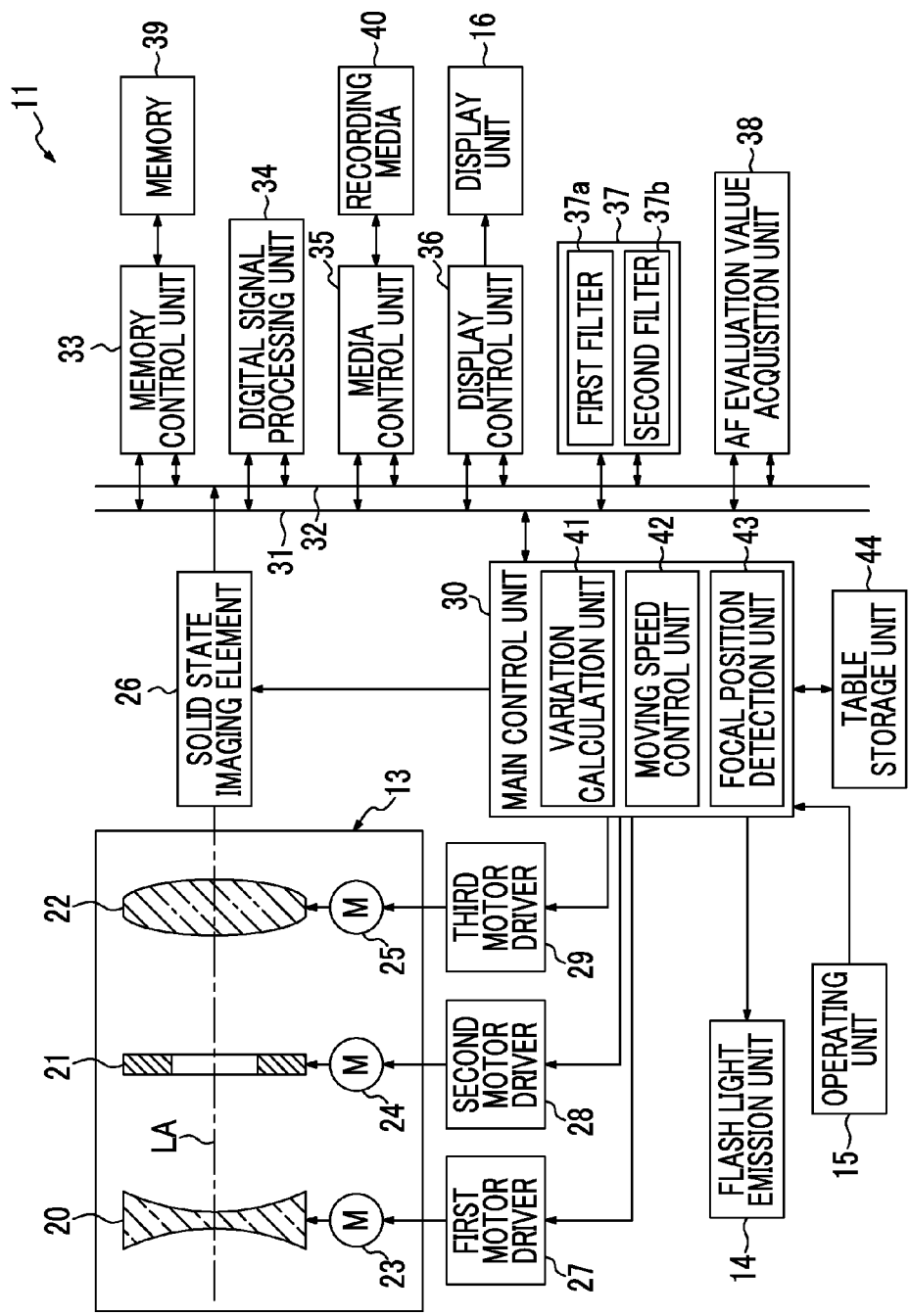
FIG. 3 is a block diagram showing the electrical configuration of the digital camera.

In FIG. 3, the lens barrel 13 is provided with a variable magnification lens 20, a diaphragm 21, and a focus lens 22 arranged along an optical axis LA, and first to third motors 23 to 25 which drive the variable magnification lens 20, the diaphragm 21, and the focus lens 22. On the light emission side of the lens barrel 13, a solid state imaging element 26 as an imaging unit is provided. The variable magnification lens 20 is constituted of one lens or a plurality of lenses, is driven by the first motor 23 to move in the optical axis direction, and changes the size (magnification) of an object image formed on a light reception surface of the solid state imaging element 26.

The diaphragm 21 is constituted of a plurality of movable blades which form an aperture 21a. In the diaphragm 21, a plurality of blades are driven by the second motor 24 to change the size of the aperture 21a, whereby the amount of light passing through the aperture 21a is changed. The focus lens 22 is constituted of one lens or a plurality of lenses, is driven by the third motor 25 to move in the optical axis direction, and changes the focusing state of the object image formed on the light reception surface of the solid state imaging element 26.

The first to third motors 23 to 25 are a stepping motor or a servo motor, and are respectively driven by first to third motor drivers 27 to 29. The first to third motor drivers 27 to 29 respectively control the first to third motors 23 to 25 under the control of a main control unit 30. In this embodiment, the third motor 25 and the third motor driver 29 constitute a lens drive unit which moves the focus lens 22 in the optical axis direction.

The flash emission unit 14 performs a flash emission operation under the control of the main control unit 30. The main control unit 30 integrally controls the entire digital camera 11 based on an operation signal input from the operating unit 15.

The solid state imaging element 26 is, for example, a single-plate color imaging type CMOS image sensor having a color filter of an RGB system, and has a light reception surface constituted of a plurality of pixels (not shown) arranged in a two-dimensional matrix. Each pixel includes a photoelectric conversion element, and photoelectrically converts the object image formed on the light reception surface by the lens barrel 13 to an imaging signal.

The solid state imaging element 26 includes signal processing circuits (all are not shown), such as a noise elimination circuit, an auto gain controller, and an A/D conversion circuit. The noise elimination circuit subjects the imaging signal to a noise elimination process. The auto gain controller amplifies the level of the imaging signal to an optimum value. The A/D conversion circuit converts the imaging signal to a digital signal and outputs the digital signal from the solid state imaging element 26. An output signal of the solid state imaging element 26 is image data (so-called RAW data) having one color signal for each pixel.

The solid state imaging element 26 is driven and controlled by the main control unit 30 according to the photographing mode selected by the mode selection button 19.

The main control unit 30 controls the respective units based on the photographing mode selected by the mode selection button 19 or predetermined photographing conditions according to a photographing scene.

The main control unit 30 is connected to a control bus 31. The solid state imaging element 26 is connected to a data bus 32. A memory control unit 33, a digital signal processing unit 34, a media control unit 35, a display control unit 36, a frequency component extraction unit 37, and an AF evaluation value acquisition unit 38 are connected to the control bus 31 and the data bus 32.

A temporary storage memory 39, such as an SDRAM, is connected to the memory control unit 33. The memory control unit 33 inputs image data output from the solid state imaging element 26 to the memory 39 and stores image data in the memory 39. The memory control unit 33 outputs image data stored in the memory 39 to the digital signal processing unit 34.

The digital signal processing unit 34 subjects image data (RAW data) input from the memory 39 to a defect correction process, a demosaic process, a gamma correction process, a white balance correction process, a YC conversion process, and the like, and generates YC image data having a luminance signal Y and a color difference signal C.

The media control unit 35 controls recording and reading of an image file in and from the recording media 40. The recording media 40 is, for example, a memory card embedded with a flash memory or the like. The format of an image file recorded in the recording media 40 is set by the operating unit 15.

In the case of the still image photographing mode, as an image file, for example, compressed image data where YC image data is compressed based on the JPEG standard or the like is recorded in the recording media 40. In the case of the moving image photographing mode, moving image data where YC image data of a plurality of frames obtained by moving image photographing is compressed based on the MPEG-4 standard or the like is recorded in the recording media 40. The compression processes are performed by the digital signal processing unit 34. In the case of the moving image photographing mode, while sound is acquired and recorded in addition to an image, in this embodiment, description of a configuration relating to sound acquisition and recording will be omitted.

The display control unit 36 controls image display on the display unit 16. The display control unit 36 converts YC image data generated by the digital signal processing unit 34 to a video signal based on the NTSC standard or the like and outputs the video signal to the display unit 16.

Figures 4, 5:
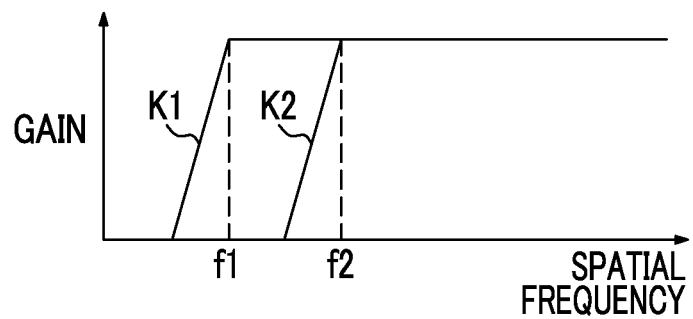
FIG. 4 is a graph showing a characteristic curve of first and second filters.
FIG. 5 is a diagram showing a table which is stored in a table storage unit.

The frequency component extraction unit 37 has a first filter 37a and a second filter 37b. The first and second filters 37a and 37b are digital filters which subject the luminance signal of YC image data to discrete cosine transformation and extract a predetermined spatial frequency component. Specifically, as shown in FIG. 4, a characteristic curve K1 of the first filter 37a has a first cutoff frequency f1. A characteristic curve K2 of the second filter 37b has a second cutoff frequency f2 higher than the first cutoff frequency f1. The first filter 37a passes a first spatial frequency component higher than the first cutoff frequency f1. The second filter 37b passes a second spatial frequency component higher than the second cutoff frequency f2.

The luminance signal which is used when the frequency component extraction unit 37 extracts the first and second spatial frequency components is a luminance signal within an AF area (not shown) set in the light reception surface of the solid state imaging element 26. The AF area can be set by the operating unit 15. An AF area suitable for a photographing scene can be automatically set by the main control unit 30.

The AF evaluation value acquisition unit 38 is constituted of an integrator. The AF evaluation value acquisition unit 38 integrates the first spatial frequency component extracted by the first filter 37a to generate a first AF evaluation value, and integrates the second spatial frequency component extracted by the second filter 37b to generate a second AF evaluation value.

The main control unit 30 has a CPU and an internal memory which stores a processing program, and controls the respective units according to the flow defined in the processing process. At the time of the AF operation, the main control unit 30 performs control such that the third motor driver 29 moves the focus lens 22 along the optical axis LA, and drives the solid state imaging element 26, the memory control unit 33, the frequency component extraction unit 37, and the AF evaluation value acquisition unit 38 in a predetermined period PT. With this, at the time of the AF operation, the first and second AF evaluation values are acquired at an interval of the predetermined time PT.

In the main control unit 30, a variation calculation unit 41, a moving speed control unit 42, and a focal position detection unit 43 are constituted. The variation calculation unit 41 calculates variations of the first and second AF evaluation values at an interval of the predetermined time PT. Specifically, the variation calculation unit 41 calculates a first variation corresponding to first-order differentiation of the first AF evaluation value, a second variation corresponding to first-order differentiation of the second AF evaluation value, and a third variation corresponding to second-order differentiation of the second AF evaluation value.

If the lens position of the focus lens 22 is "x", the moving distance for the predetermined time PT when the focus lens 22 moves at a "low speed" described below is "Δx", and the first and second AF evaluation values at the lens position "x" are respectively $E_1(x)$ and $E_2(x)$ the first to third variations $V_1(x)$ to $V_3(x)$ are represented by Expressions (1) to (3).

$$V_1(x)=\{E_1(x)-E_1(x-\Delta x)\}/\Delta x \quad (1)$$

$$V_2(x)=\{E_2(x)-E_2(x-\Delta x)\}/\Delta x \quad (2)$$

$$V_3(x)=\{V_2(x)-V_2(x-\Delta x)\}/\Delta x \quad (3)$$

Here, $E_1(x-\Delta x)$ and $E_2(x-\Delta x)$ are the first and second AF evaluation values at the lens position "x−Δx" before the predetermined time PT from the lens position "x".

When the focus lens 22 moves at a "high speed" or a "medium speed" described below, since the moving distance of the focus lens 22 for the predetermined time PT is greater than the distance Δx, the variation calculation unit 41 determines $E_1(x-\Delta x)$ and $E_2(x-\Delta x)$ by an interpolation arithmetic operation.

A table storage unit 44 which stores a table TB shown in FIG. 5 is connected to the main control unit 30. The table storage unit 44 is constituted of a nonvolatile memory, such as a flash memory. In the table TB, the correspondence relationship between the rates $RV_1(x)$ to $RV_3(x)$ of increase or decrease of the first to third variations $V_1(x)$ to $V_3(x)$ and the moving speed SP of the focus lens 22 is defined. The rates $RV_1(x)$ to $RV_3(x)$ of increase or decrease are represented by Expressions (4) to (6).

$$RV_1(x)=\{V_1(x)-V_1(x-\Delta x)\}/V_1(x) \quad (4)$$

$$RV_2(x)=\{V_2(x)-V_2(x-\Delta x)\}/V_2(x) \quad (5)$$

$$RV_3(x)\{V_3(x)-V_3(x-\Delta x)\}/V_3(x) \quad (6)$$

In the table TB, "+" indicates that the rate of increase or decrease is greater than a threshold value T1 (T1>0) and is increasing. "−" indicates that the rate of increase or decrease is smaller than a threshold value T2 (T2<0) and is decreasing. "0" indicates that the rate of increase or decrease is equal to or greater than the threshold value T2 and equal to or less than the threshold value T1, and is not substantially increased or decreased. In this embodiment, for example, T1=0.01 and T2=−0.01 are set. "H", "M", and "L" respectively represent the "high speed", the "medium speed", and the "low speed". In this embodiment, for example, it is assumed that the medium speed is a speed twice the low speed, and the high speed is a speed is a speed four times the low speed.

The moving speed control unit 42 controls the moving speed of the focus lens 22 based on the rates of increase or decrease of the first to third variations $V_1(x)$ to $V_3(x)$ calculated by the variation calculation unit 41 referring to the table TB. Specifically, the moving speed control unit 42 acquires the first to third variations $V_1(x)$ to $V_3(x)$ from the variation calculation unit 41 at an interval of the predetermined time PT, and calculates the rates $RV_1(x)$ to $RV_3(x)$ of increase or decrease to extract a corresponding speed SP from the table TB. The moving speed control unit 42 changes the speed of the focus lens 22 to the extracted SP when the speed SP extracted from the table TB is different from the current speed of the focus lens 22.

The focal position detection unit 43 specifies the focal position of the focus lens 22 by detecting the peak of at least one of the first and second AF evaluation values $E_1(x)$ and $E_2(x)$. Specifically, the focal position detection unit 43 monitors change in the first and second AF evaluation values $E_1(x)$ and $E_2(x)$ acquired by the AF evaluation value acquisition unit 38 at an interval of the predetermined time PT, basically detects a position P1 of the focus lens 22 where the first AF evaluation value $E_1(x)$ becomes a maximum value, and specifies the position P1 as the focal position. When the maximum value of the first AF evaluation value $E_1(x)$ is smaller than a predetermined value, or when a peak is not detected at the first AF evaluation value $E_1(x)$, the focal position detection unit 43 detects a position P2 of the focus lens 22 where the second AF evaluation value $E_2(x)$ becomes a maximum value, and specifies the position P2 as the focal position.

For starting the AF operation, the main control unit 30 determines whether or not the moving direction of the focus lens 22 is toward a FAR side and a NEAR side, and moves the focus lens 22 in the determined direction.

Specifically, at the time of the start of the AF operation, the main control unit 30 moves the focus lens 22 by a distance Δx from the current position toward the FAR side and the NEAR side while allowing the solid state imaging element 26 to perform imaging, and moves the focus lens 22 in a direction in which the first and second AF evaluation values $E_1(x)$ and $E_2(x)$ increase. When the increase directions of the first and second AF evaluation values $E_1(x)$ and $E_2(x)$ are different, for example, the focus lens 22 is moved in the increase direction of the first AF evaluation value $E_1(x)$. At the time of the AF operation, the moving speed control unit 42 sets the moving speed of the focus lens 22 to the "low speed".

The main control unit 30 performs auto exposure (AE) control for detecting the exposure of the solid state imaging element 26 based on the luminance signal of YC image data and controlling the second motor driver 28 based on the detected exposure to adjust the size of the aperture 21a of the diaphragm 21 to a proper exposure. The detailed description of the AE control will be omitted.

Next, the action of the digital camera 11 will be described. First, if the power button 17 is operated by the user and the power supply is turned to an on state, a power supply voltage is supplied to the respective units of the digital camera 11. If the mode selection button 19 is operated by the user and the operation mode is set to the still image photographing mode or the moving image photographing mode, the display (hereinafter, referred to as live view display) of the live view image is displayed on the display unit 16.

The live view display is performed when the main control unit 30 causes the solid state imaging element 26 to repeatedly perform an imaging operation in a period PT and displays an image based on image data output from the solid state imaging element 26 on the display unit 16 through the display control unit 36. During the live view display, the AF operation and the AE control are repeatedly performed. The user can determine composition while viewing the live view display and can perform imaging.

When the operation mode is the still image photographing mode, if the release button 18 is half-depressed by the user, the AF operation and the AE control are performed. Thereafter, if the release button 18 is full-depressed, image data obtained by the solid state imaging element 26 is converted to compressed image data by the digital signal processing unit 34, and is recorded in the recording media 40 through the media control unit 35.

When the operation mode is the moving image photographing mode, image data of multiple frames obtained by the solid state imaging element 26 in a period during which the release button is full-depressed again after the release button 18 is full-depressed is converted to moving image data by the digital signal processing unit 34, and is recorded in the recording media 40 through the media control unit 35.

Figure 6:
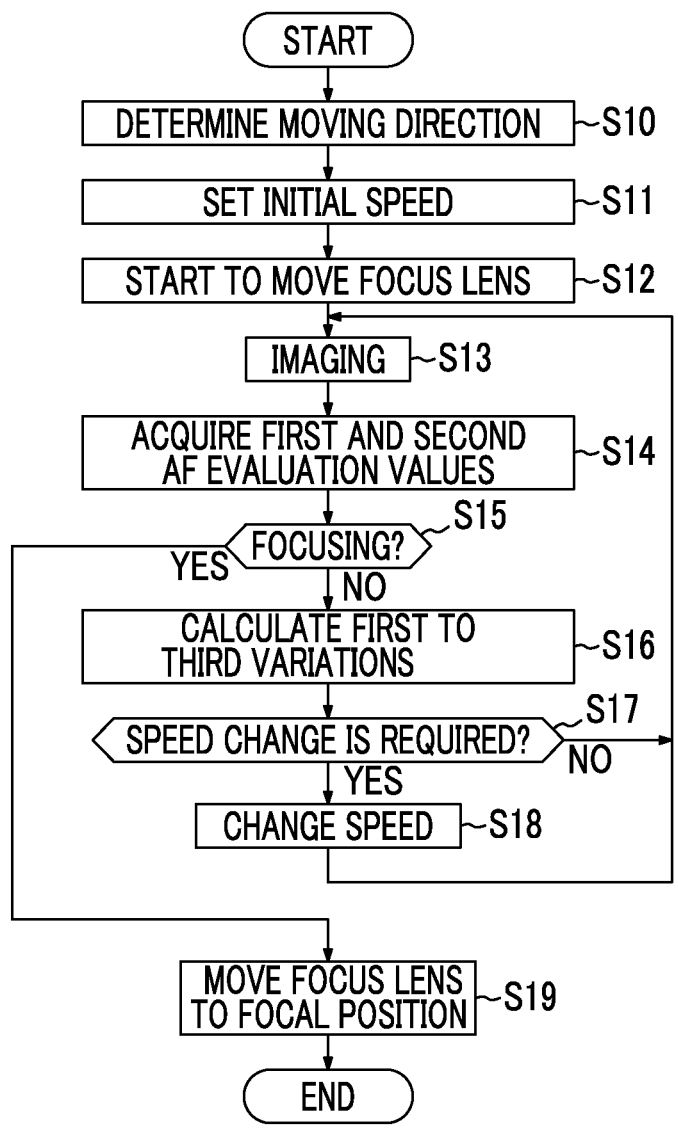
FIG. 6 is a flowchart illustrating an AF operation.

Next, the AF operation will be described referring to the flowchart shown in FIG. 6. If the AF operation starts, the focus lens 22 is moved toward the FAR side and the NEAR side by the distance Δx from the current position by the main control unit 30, and the direction in which the first and second AF evaluation values $E_1(x)$ and $E_2(x)$ increase is determined as the moving direction (Step S10). When the focus lens 22 is positioned at the FAR end and the NEAR end, the acquisition of the first and second AF evaluation values $E_1(x)$ and $E_2(x)$ is not performed, and the direction toward the NEAR side and the FAR side is determined as the moving direction.

After the moving direction of the focus lens 22 is determined, the initial speed of the focus lens 22 is set to the "low speed" by the moving speed control unit 42 (Step S11), and the moving of the focus lens 22 starts in the direction determined in Step S10 (Step S12). After the moving of the focus lens 22 starts, the imaging operation is repeatedly performed in the period PT by the solid state imaging element 26 (Step S13).

The first and second spatial frequency components are extracted by the frequency component extraction unit 37 each time the imaging operation is performed by the solid state imaging element 26, and the first and second AF evaluation values $E_1(x)$ and $E_2(x)$ are acquired by the AF evaluation value acquisition unit 38 (Step S14). If the first and second AF evaluation values $E_1(x)$ and $E_2(x)$ are acquired, the peak detection of the first and second AF evaluation values $E_1(x)$ and $E_2(x)$ is performed by the focal position detection unit 43 (Step S15). For the peak detection, the imaging operation should be performed at least three times.

When no peak is detected in the first and second AF evaluation values $E_1(x)$ and $E_2(x)$, the first to third variations $V_1(x)$ to $V_3(x)$ are calculated by the variation calculation unit 41 based on the first AF evaluation values $E_1(x)$ and $E_1(x-\Delta x)$ obtained by the last two imaging operations and the second AF evaluation values $E_2(x)$, $E_2(x-\Delta x)$, and $E_2(x-2\Delta x)$ obtained by the last three imaging operations (Step S16).

If the first to third variations $V_1(x)$ to $V_3(x)$ are calculated, the rates $RV_1(x)$ to $RV_3(x)$ of increase or decrease are calculated by the moving speed control unit 42, the corresponding speed SP is extracted from the table TB, and it is determined whether or not a speed change of the focus lens 22 is required (Step S17). When the speed SP extracted from the table TB is different from the current speed of the focus lens 22 (in Step S17, YES), the speed is changed to the speed SP (Step S18). When the extracted speed SP is equal to the current speed of the focus lens 22 (in Step S17, NO), a speed change is not performed.

The operations of Steps S13 to S17 are repeatedly performed, and in Step S15, when a peak is detected in the first AF evaluation value $E_1(x)$, the peak position is specified as the focal position (in Step S15, YES), the focus lens 22 is moved to the focal position (Step S15), and the AF operation ends. When the maximum value of the first AF evaluation value $E_1(x)$ is smaller than a predetermined value, or when no peak is detected and a peak is detected in the second AF evaluation value $E_2(x)$, the peak position is specified as the focal position, and the focus lens 22 is moved to the focal position.

Figure 7:
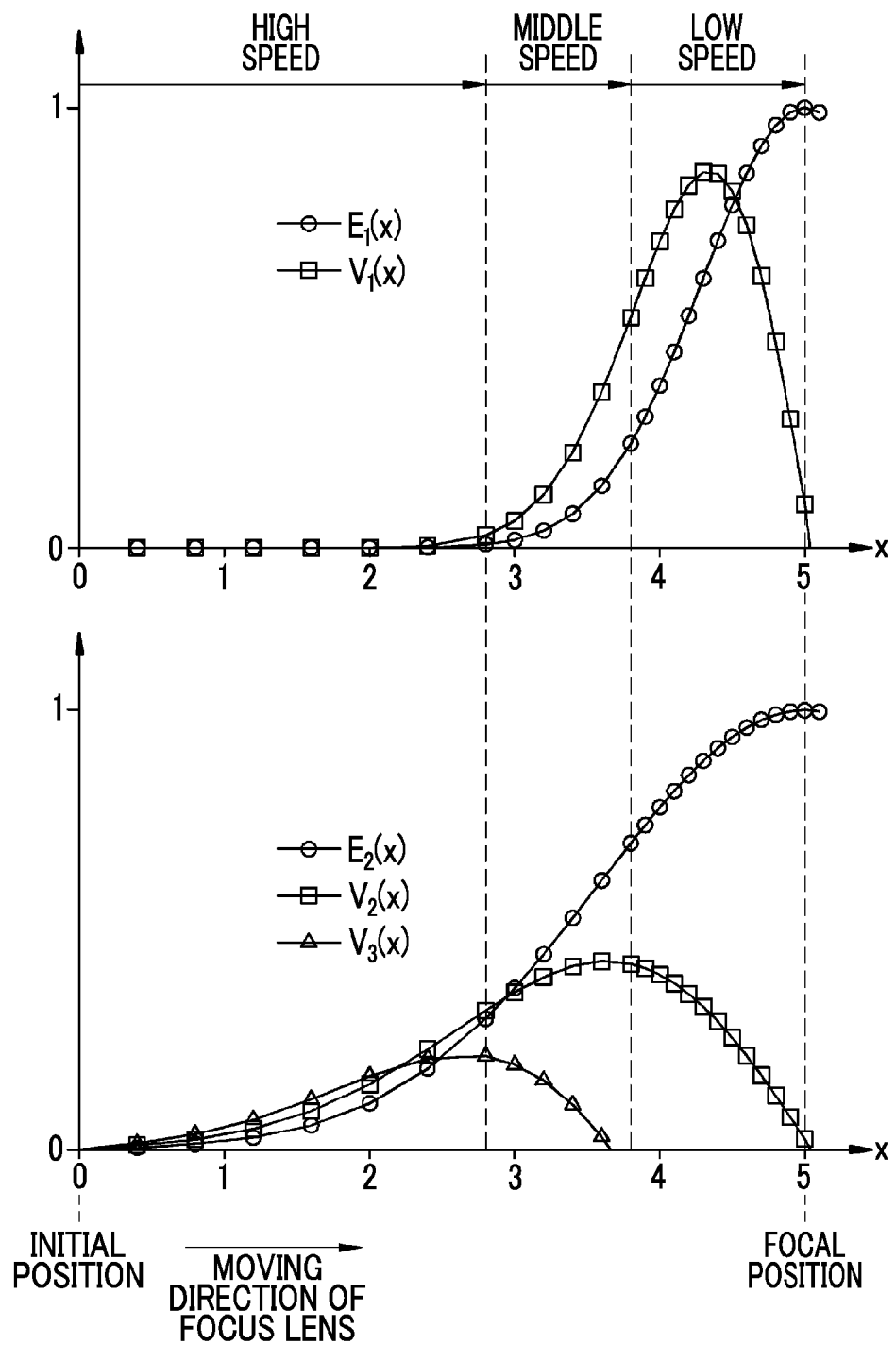
FIG. 7 is a graph showing a simulation result of the AF operation.

FIG. 7 shows a simulation result of the AF operation of this embodiment. Both of the first and second AF evaluation values $E_1(x)$ and $E_2(x)$ are defined as a Gaussian function having a peak in an area of $x>0$, and the half-value width of the second AF evaluation value $E_2(x)$ is twice the half-value width of the first AF evaluation value $E_1(x)$.

In order to move the focus lens 22 from an initial position ($x=0$) in the positive direction of x, if the first to third variations $V_1(x)$ to $V_3(x)$ are calculated while increasing x from $x=0$, all of the first to third variations $V_1(x)$ to $V_3(x)$ have an increase tendency ($RV_1(x)>T1$, $RV_2(x)>T1$, $RV_3(x)>T1$). According to the table TB, since this corresponds to the "high speed", thereafter, in order to move the focus lens 22 at a high speed, x is increased by 0.4, and the first to third variations $V_1(x)$ to $V_3(x)$ are calculated each time x is increased.

This tendency is continued, and when $x=2.8$ is reached, the first and second variations $V_1(x)$ and $V_2(x)$ have an increase tendency ($RV_1(x)>T1$, $RV_2(x)>T1$), while the third variation $V_3(x)$ is changed to a decrease tendency ($RV_3(x)<T2$) According to the table TB, since this corresponds to the "medium speed", thereafter, in order to move the focus lens 22 at a medium speed, x is increased by 0.2, and the first to third variations $V_1(x)$ to $V_3(x)$ are calculated each time x is increased.

This tendency is continued, and when $x=3.8$ is reached, the first variation $V_1(x)$ has an increase tendency ($RV_1(x)>T1$), while the second variation $V_2(x)$ is changed to a decrease tendency ($RV_2(x)<T2$) and the third variation $V_3(x)$ is changed to an increase tendency ($RV_3(x)>T1$). According to the table TB, since this corresponds to the "low speed", thereafter, in order to move the focus lens 22 at a low speed, x is increased by 0.1, and the first to third variations $V_1(x)$ to $V_3(x)$ are calculated each time x is increased. This tendency is continued, and a peak is detected in the first and second AF evaluation values $E_1(x)$ and $E_2(x)$ when $x=5.0$.

In this way, after the AF operation starts, when the focus lens 22 approaches the focal position, since the moving speed of the focus lens 22 is changed from the high speed to the medium speed and the low speed, the AF operation time is reduced without deteriorating the detection accuracy of the focal position.

Referring to FIG. 7, it is understood that the change point from the high speed to the medium speed substantially corresponds to the peak position of the second variation $V_2(x)$, and the change point from the medium speed to the low speed substantially corresponds to the peak position of the third variation $V_3(x)$.

Second Embodiment

In the first embodiment, although the table storage unit 44 stores only one table, a plurality of tables may be stored in the table storage unit 44, and a table for use in the moving speed control unit 42 may be selected according to predetermined conditions.

Figure 8:
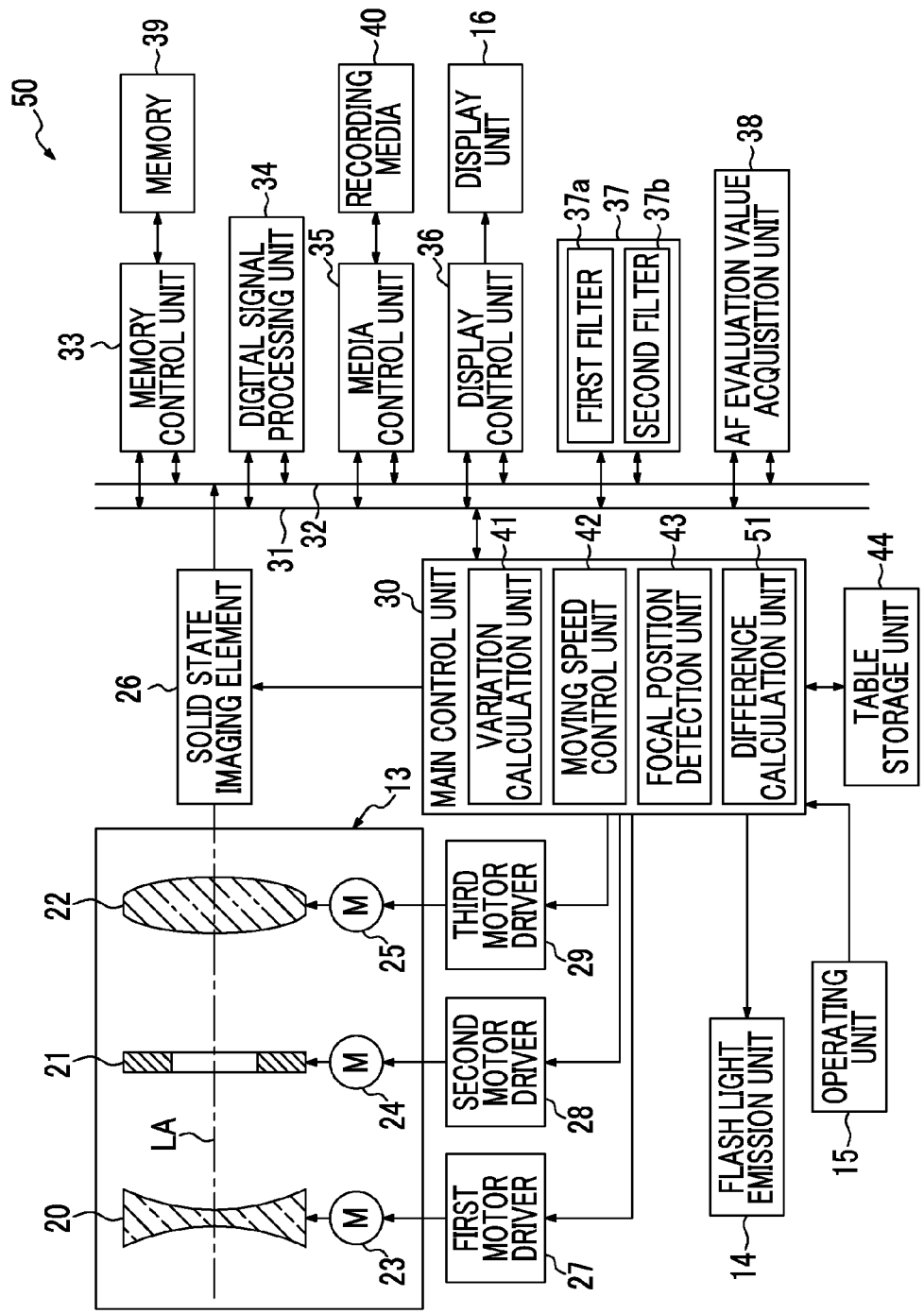
FIG. 8 is a block diagram showing the electrical configuration of a digital camera of a second embodiment.

In FIG. 8, a digital camera 50 of a second embodiment is provided with the main control unit 30 further including a difference calculation unit 51, in addition to the variation calculation unit 41, the moving speed control unit 42, and the focal position detection unit 43. The table storage unit 44 stores first and second tables TB1 and TB2 shown in FIG. 9. Since other configurations are the same as those in the first embodiment, the same parts are represented by the same reference numerals, and description thereof will not be repeated.

The difference calculation unit 51 calculates the difference between the first AF evaluation value $E_1(x)$ and the second AF evaluation value $E_2(x)$ each time the first and second AF evaluation values $E_1(x)$ and $E_2(x)$ are acquired by the AF evaluation value acquisition unit 38. The difference is the absolute value difference Z ($Z=|E_1(x)-E_2(x)|$) between the first and second AF evaluation values $E_1(x)$ and $E_2(x)$. The moving speed control unit 42 selects the first table TB1 when the absolute value difference Z is equal to or greater than a predetermined value, and selects the second table TB2 when the absolute value difference Z is smaller than the predetermined value.

The first table TB1 is the same as the table TB of the first embodiment. The second table TB2 is different from the first table TB1 in speed setting of a portion surrounded by a circle. In the second table TB2, when all of the first to third variations $V_1(x)$ to $V_3(x)$ have an increase tendency ($RV_1(x)>T1$, $RV_2(x)$ T1, $RV_3(x)>T1$), the "low speed" is set, and when first and second variations $V_1(x)$ and $V_2(x)$ have an increase tendency ($RV_1(x)>T1$, $RV_2(x)>T1$) and the third variation $V_3(x)$ is not increased or decreased ($T1>RV_3(x)>T2$), the "medium speed" is set.

When the spatial frequency of the luminance signal in the AF area inclines toward a high frequency side, the difference between the first and second spatial frequency components extracted by the frequency component extraction unit 37 is small, and the difference between the first and second AF evaluation values $E_1(x)$ and $E_2(x)$ is small. In this case, since the half-value width of the second AF evaluation value $E_2(x)$ is narrowed, and the peak position of the second variation $V_2(x)$ is shifted in a direction of the focal position, if the moving speed of the focus lens 22 is set using the same first table TB1 as in the first embodiment, the focus lens 22 is moved near the focal position while maintaining the "medium speed" or the "high speed", and the detection accuracy of the focal position may be degraded. In contrast, in this embodiment, since the second table TB2 is used when the absolute value difference Z is smaller than the predetermined value, and the focus lens 22 is driven at the "low speed" over substantially the entire range from the initial position to the focal position, degradation of the detection accuracy of the focal position is prevented.

Third Embodiment

Figure 10:
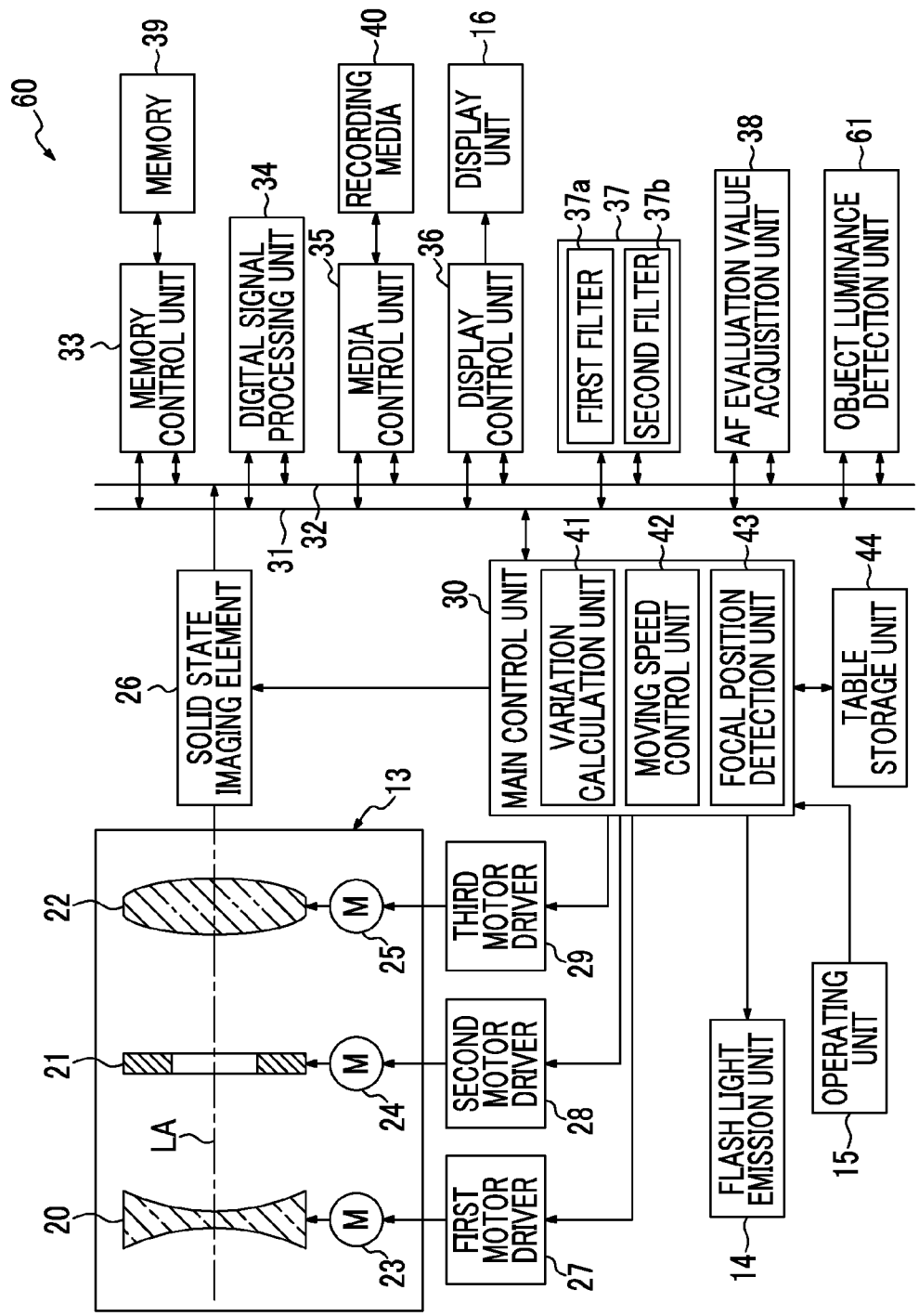
FIG. 10 is a block diagram showing the electrical configuration of a digital camera of a third embodiment.

In FIG. 10, a digital camera 60 of a third embodiment includes an object luminance detection unit 61. The table storage unit 44 stores first and second tables TB1 and TB2 shown in FIG. 11. Since other configurations are the same as those in the first embodiment, the same parts are represented by the same reference numerals, and description thereof will not be repeated.

The object luminance detection unit 61 is connected to the control bus 31 and the data bus 32. The object luminance detection unit 61 integrates the luminance signal in the AF area to determine the average value, thereby detecting object luminance in the AF area. The moving speed control unit 42 selects the first table TB1 when the object luminance detected by the object luminance detection unit 61 is equal to or greater than a predetermined value, and selects the second table TB2 when the object luminance is smaller than the predetermined value.

The first table TB1 is the same as the table TB of the first embodiment. The second table TB2 is different from the first table TB1 in speed setting of a portion surrounded by a circle. In the second table TB2, "C" indicates that a set speed is not changed and is continued as it is.

Figure 12:
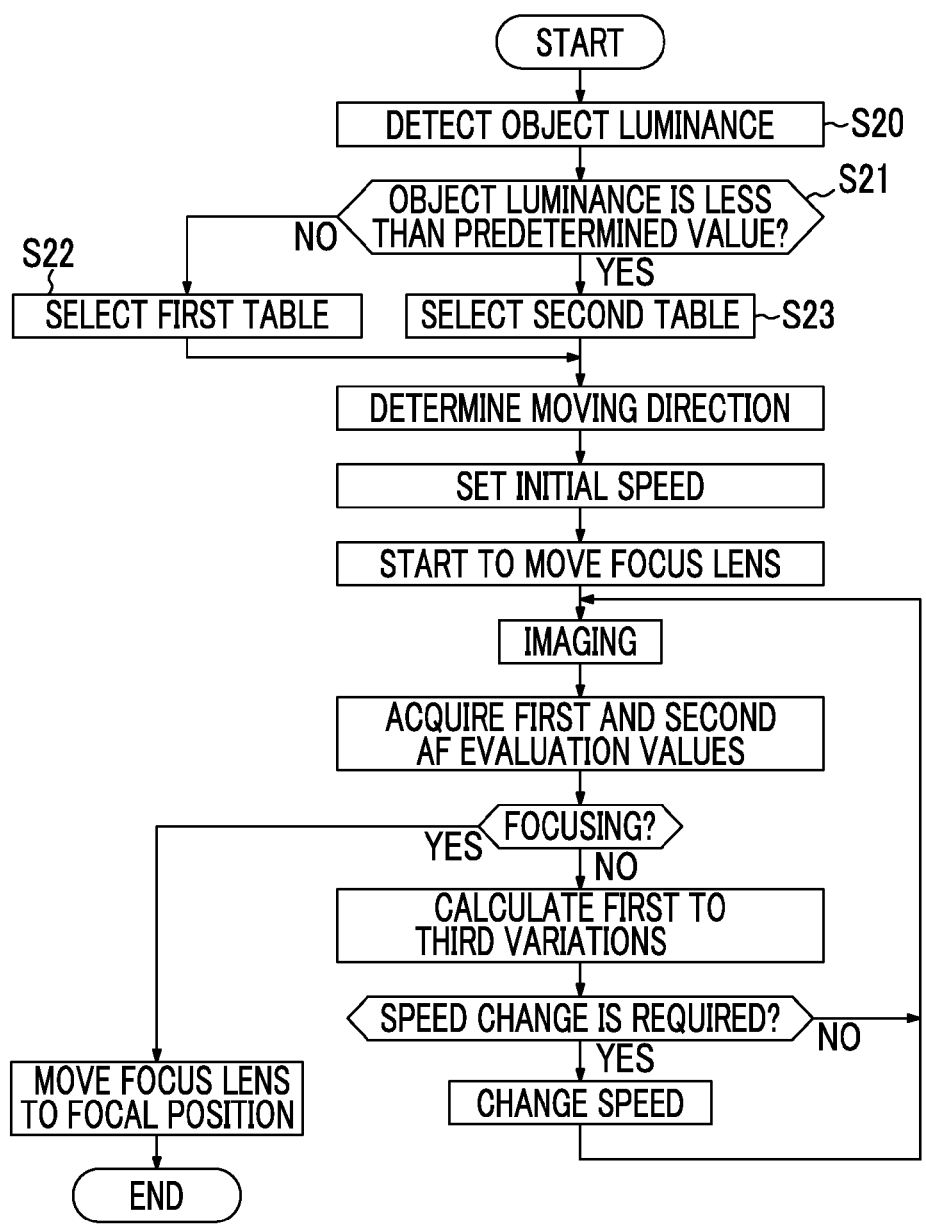
FIG. 12 is a flowchart illustrating an AF operation of the third embodiment.

In this embodiment, as shown in the flowchart of FIG. 12, if the AF operation starts, the object luminance is detected by the object luminance detection unit 61 (Step S20), and it is determined whether or not the object luminance is smaller than the predetermined value (Step S21). When the object luminance is equal to or greater than the predetermined value (in Step S21, NO), the first table TB1 is selected (Step S22). When the object luminance is smaller than the predetermined value (in Step S21, YES), the second table TB2 is selected (Step S23). The subsequent steps are the same as those in the first embodiment.

When the object luminance is low, since noise occurs in image data, and the acquisition accuracy of the first and second AF evaluation values and the first to third variations is degraded, if the moving speed of the focus lens 22 is set using the same first table TB1 as in the first embodiment, a speed change may be frequently performed more than necessary. In contrast, in this embodiment, when the object luminance is lower than the predetermined value, since the second table TB2 having setting of continuation (C) is used, the number of speed changes is reduced.

Fourth Embodiment

In a digital camera of a fourth embodiment, the table storage unit 44 stores the first and second tables TB1 and TB2 shown in FIG. 11, and the first table TB1 or the second table TB2 is selected according to the operation mode (the still image photographing mode or the moving image photographing mode). Since other configurations are the same as those in the first embodiment, the same parts are represented by the same reference numerals, and description thereof will not be repeated.

Figure 13:
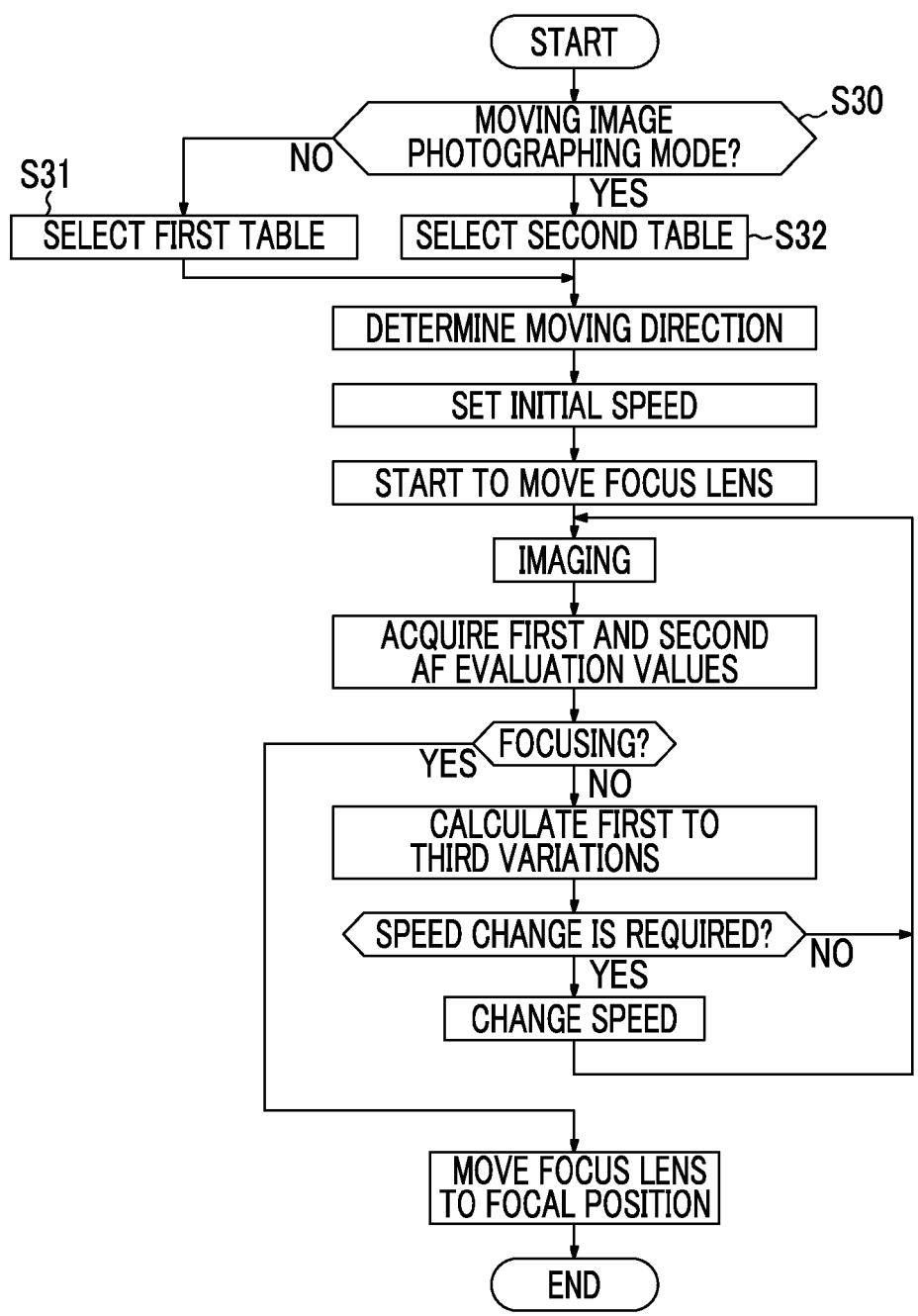
FIG. 13 is a flowchart illustrating an AF operation of a fourth embodiment.

In this embodiment, as shown in the flowchart of FIG. 13, if the AF operation starts, the main control unit 30 determines whether or not the operation mode currently set by the mode selection button 19 is the moving image photographing mode (Step S30). When the still image photographing mode is set instead of the moving image photographing mode (in Step S30, NO), the first table TB1 is selected (Step S31). When the moving image photographing mode is set (in Step S30, YES), the second table TB2 is selected (Step S32). The subsequent steps are the same as those in the first embodiment.

At the time of photographing a moving image, if the moving speed of the focus lens 22 is set using the same first table TB1 as in the first embodiment, a speed change may be frequently performed with the movement of the object; however, in this embodiment, at the time of photographing a moving image, since second table TB2 having setting of continuation (C) is used, the number of speed changes is reduced.

Fifth Embodiment

Figure 14:
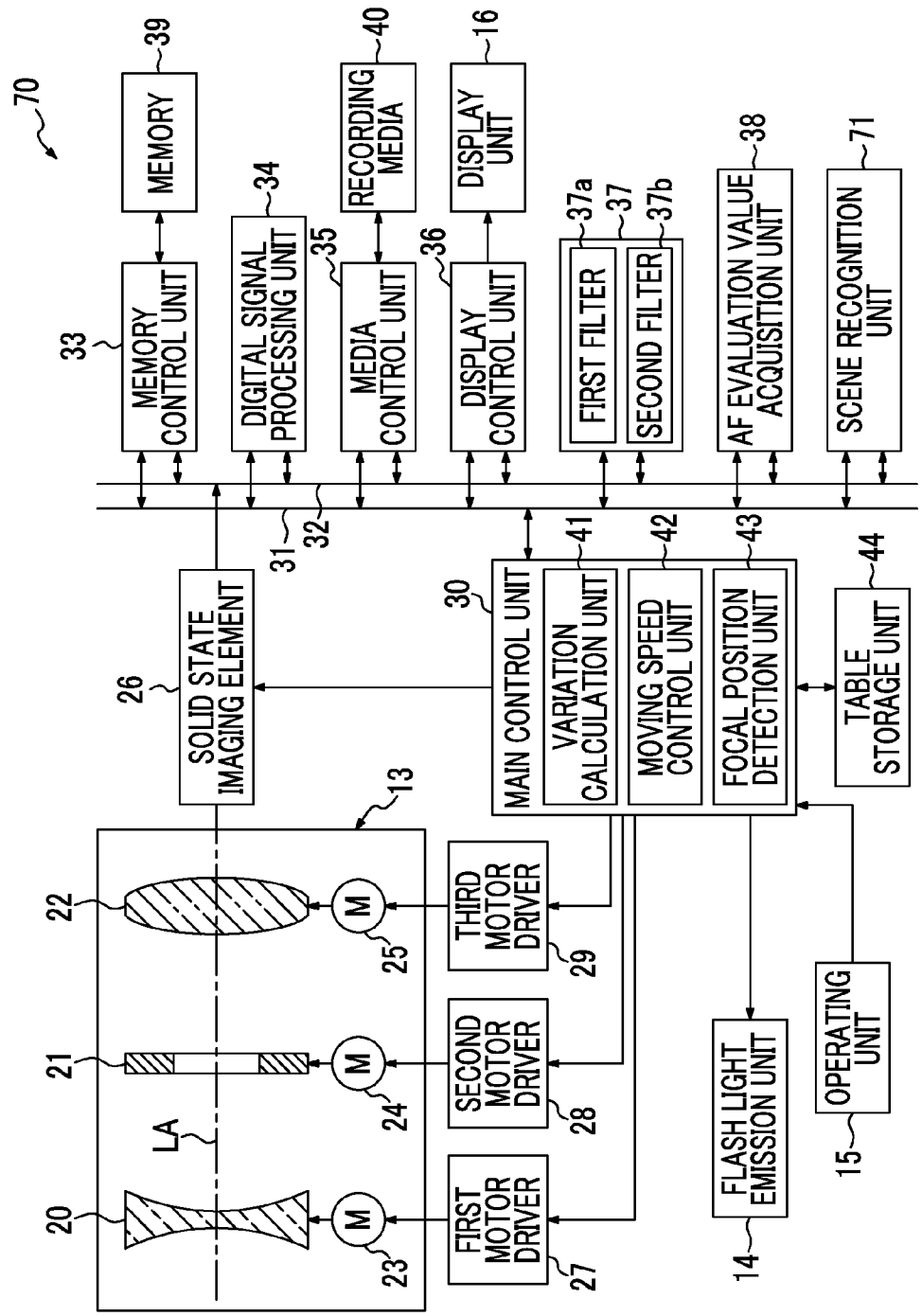
FIG. 14 is a block diagram showing the electrical configuration of a digital camera of a fifth embodiment.

In FIG. 14, a digital camera 70 of a fifth embodiment includes a scene recognition unit 71. The table storage unit 44 stores first and second tables TB1 and TB2 shown in FIG. 15. Since other configurations are the same as those in the first embodiment, the same parts are represented by the same reference numerals, and description thereof will not be repeated.

The scene recognition unit 71 recognizes the photographing scene (landscape, figure, macro, or the like) of the object imaged by the solid state imaging element 26 based on image data. The scene recognition process is disclosed, for example, in JP2010-034718A. The moving speed control unit 42 selects either of the first and second tables TB1 and TB2 according to the photographing scene recognized by the scene recognition unit 71.

The first table TB1 is the same as the table TB of the first embodiment. The second table TB2 is different from the first table TB1 in that speed setting of a portion surrounded by a circle is the "medium speed" or the "low speed". The second table TB2 is selected when the photographing scene is "landscape".

Figure 16:
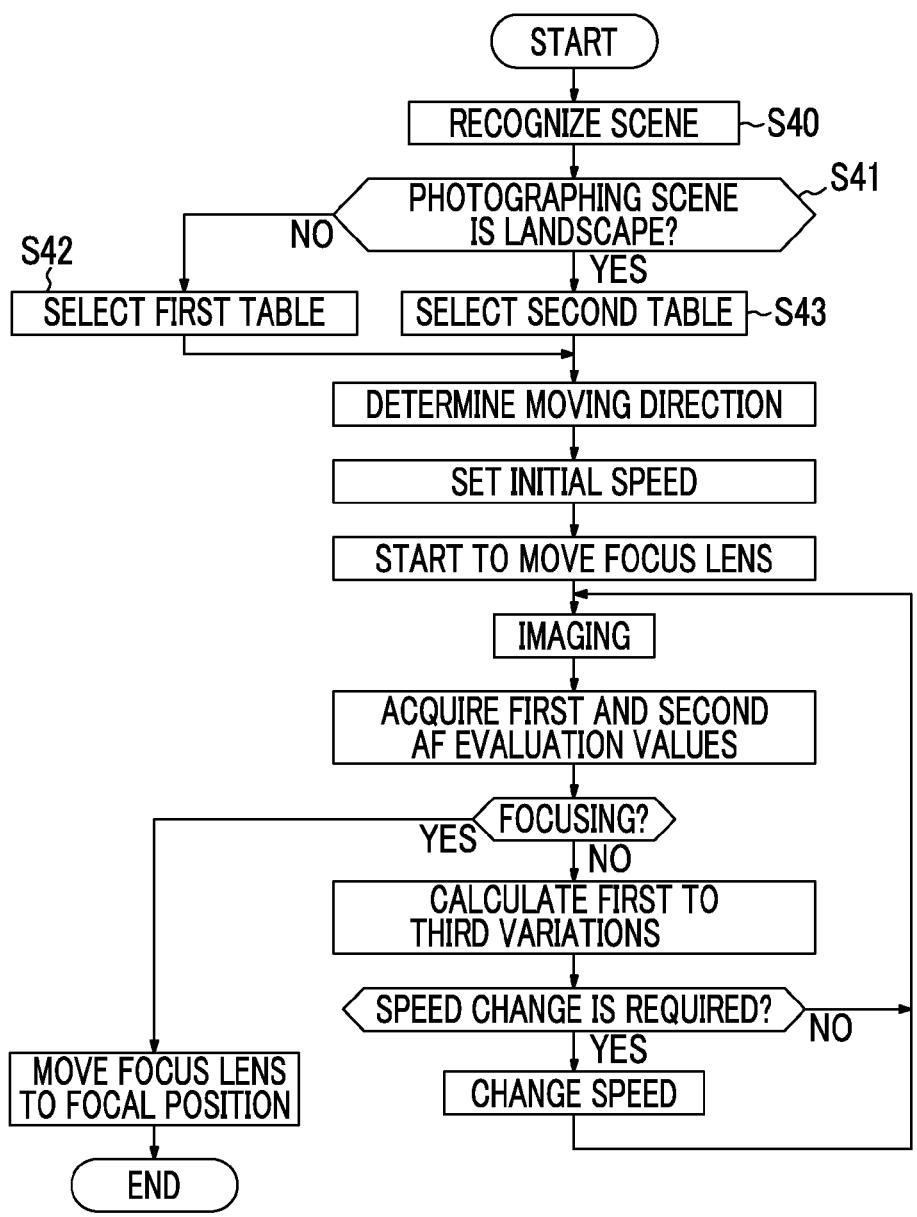
FIG. 16 is a flowchart illustrating an AF operation of the fifth embodiment.

In this embodiment, as shown in the flowchart of FIG. 16, if the AF operation starts, the photographing scene is recognized by the scene recognition unit 71 (Step S40), and it is determined whether or not the photographing scene is "landscape" (Step S41) When the photographing scene is a scene other than "landscape" (in Step S41, NO), the first table TB1 is selected (Step S42) When the photographing scene is "landscape" (in Step S41, YES) the second table TB2 is selected (Step S43). The subsequent steps are the same as those in the first embodiment.

When the photographing scene is landscape, such as woods, since an object has many high frequency components, if the moving speed of the focus lens 22 is set using the same first table TB1 as in the first embodiment, the focus lens 22 is moved to the vicinity of the focal position while maintaining the "high speed", and the detection accuracy of the focal position may be degraded. In this embodiment, when the photographing scene is landscape, since the second table TB2 is used, and the focus lens 22 is driven at the "medium speed" or the "low speed" over substantially the entire range from the initial position to the focal position, degradation of the detection accuracy of the focal position is prevented.

When the photographing scene is set by the mode selection button 19 or the like, a table may be selected based on the set photographing scene. The number of tables is not limited to two, and three or more tables may be stored in the table storage unit 44 corresponding to various photographing scenes.

Sixth Embodiment

Figure 17:
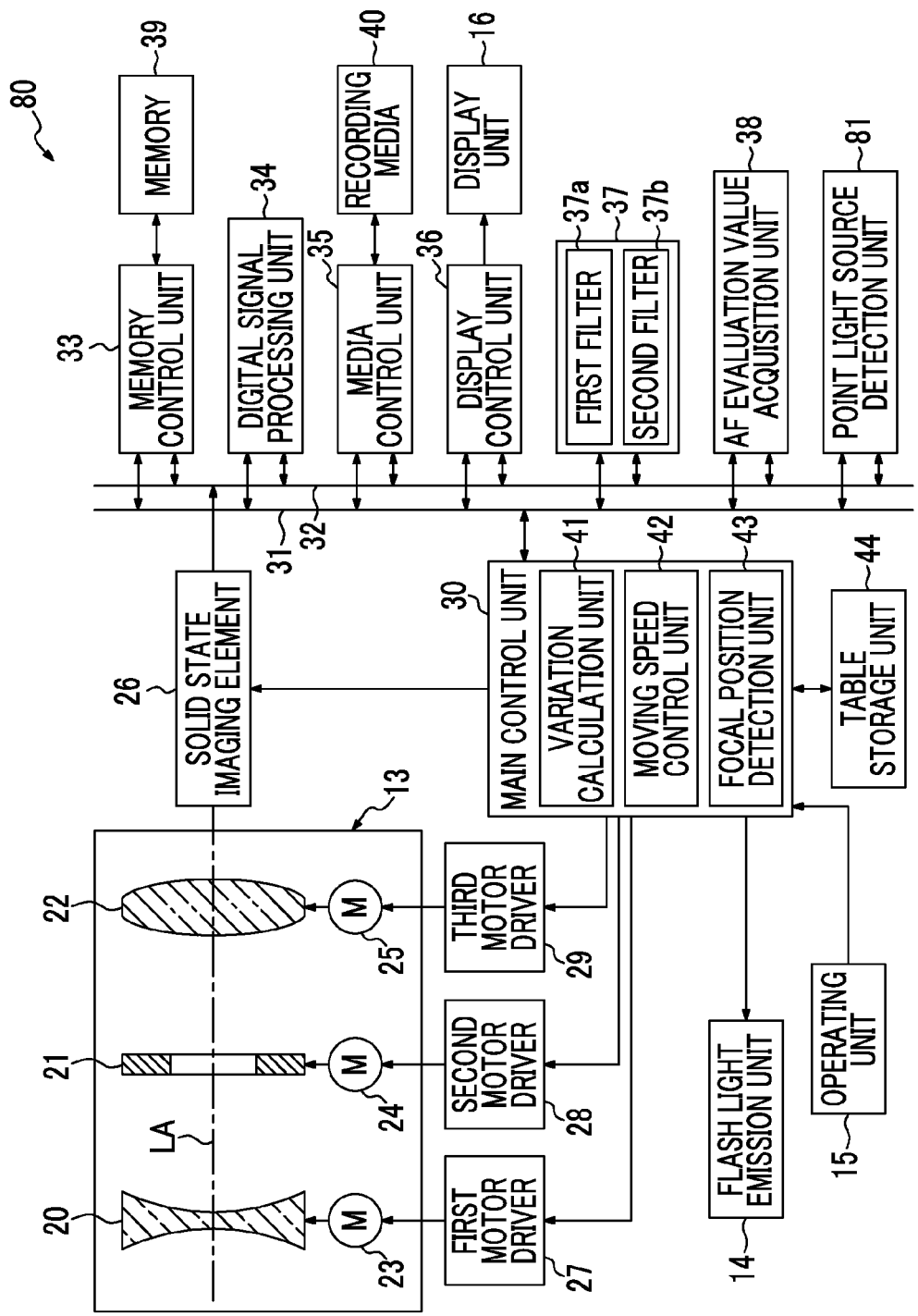
FIG. 17 is a block diagram showing the electrical configuration of a digital camera of a sixth embodiment.

In FIG. 17, a digital camera 80 of a sixth embodiment includes a point light source detection unit 81. The table storage unit 44 stores the first and second tables TB1 and TB2 shown in FIG. 11. Since other configurations are the same as those in the first embodiment, the same parts are represented by the same reference numerals, and description thereof will not be repeated.

The point light source detection unit 81 detects whether or not a point light source exists in an AF area based on image data. The point light source detection process is disclosed, for example, in JP2013-25650A. The point light source is an area where local light having a size equal to or greater than a predetermined size exists. The moving speed control unit 42 selects the first table TB1 when no point light source is detected by the point light source detection unit 81 immediately after the AF operation starts, and selects the second table TB2 when the point light source is detected.

If the point light source exists in the AF area, since the acquisition accuracy of the first and second AF evaluation values and the first to third variations is degraded, if the moving speed of the focus lens 22 is set using the same first table TB1 as in the first embodiment, a speed change may be frequently performed more than necessary. In this embodiment, when the object luminance is lower than the predetermined value, since the second table TB2 having setting of continuation (C) is used, the number of speed changes is reduced.

Seventh Embodiment

Figure 18:
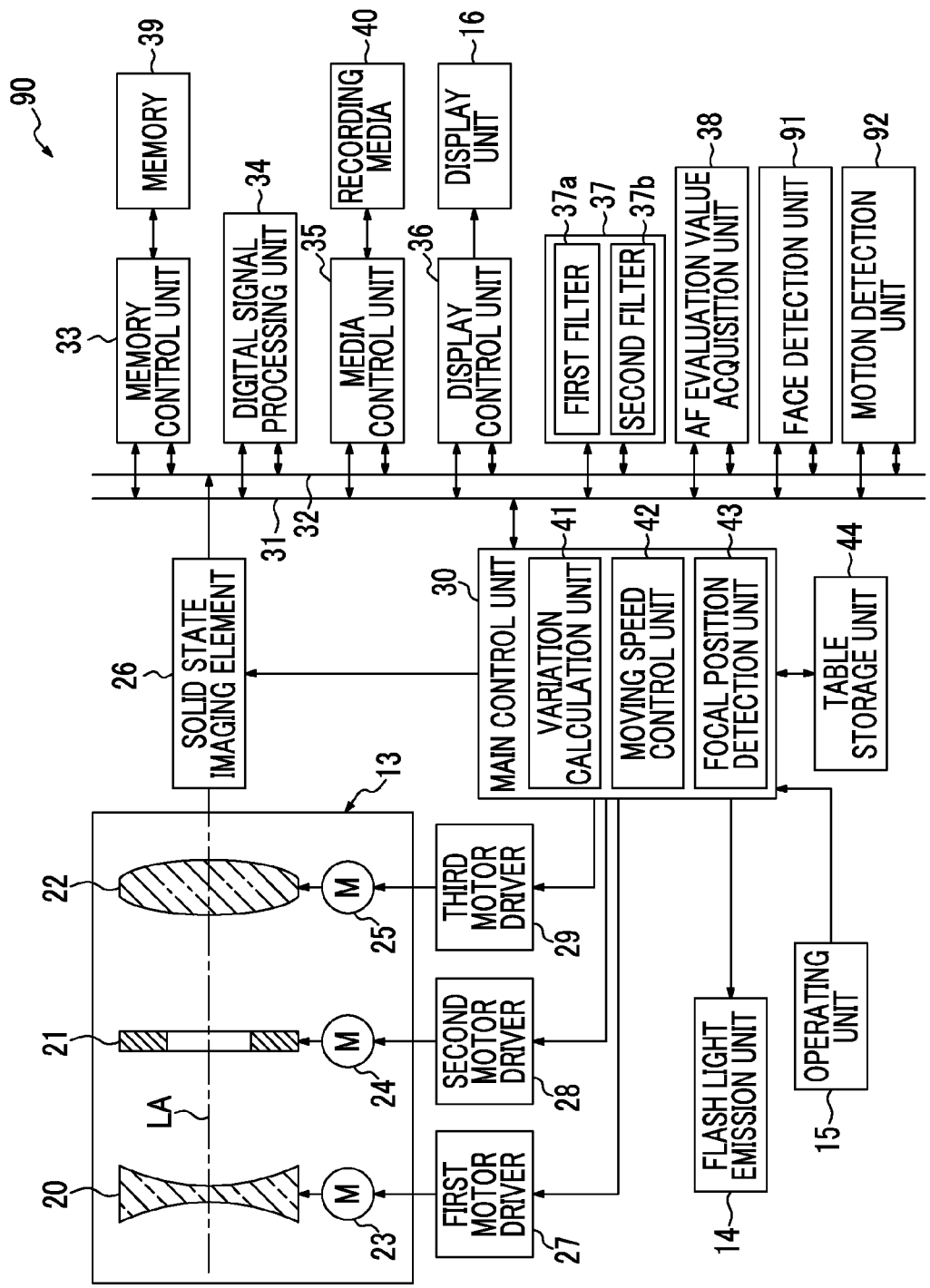
FIG. 18 is a block diagram showing the electrical configuration of a digital camera of a seventh embodiment.
Figure 19:
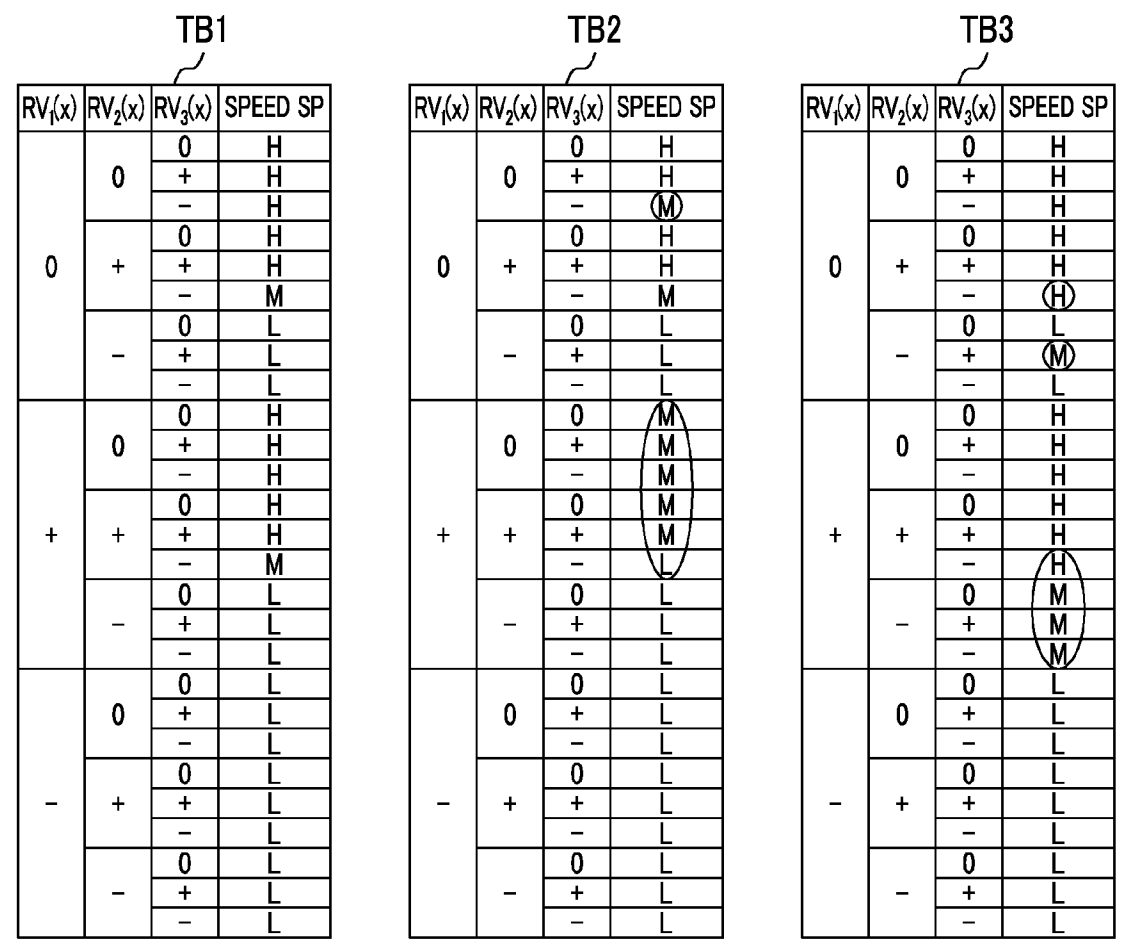

In FIG. 18, a digital camera 90 of a seventh embodiment includes a face detection unit 91 and a motion detection unit 92. The table storage unit 44 stores first to third tables TB1 to TB3 shown in FIG. 19. Since other configurations are the same as those in the first embodiment, the same parts are represented by the same reference numerals, and description thereof will not be repeated.

The face detection unit 91 detects a face of a person as an object from each piece of image data generated by the solid state imaging element 26 at an interval of a predetermined time PT. When the face is detected, the face detection unit 91 determines the position and size of the face in the image. The face detection process is disclosed, for example, in JP2012-185846A.

The motion detection unit 92 detects the motion of the object (face) by monitoring the position of the face detected by the face detection unit 91 from each piece of image data generated by the solid state imaging element 26 at an interval of the predetermined time PT. When the motion of the object is detected, the motion detection unit 92 determines the variation rate of the size of the object at an interval of the predetermined time PT, and determines whether or not the motion direction of the object is the same as the moving direction of the focus lens 22 based on the variation rate. The moving speed control unit 42 selects either of the first to third tables TB1 to TB3 according to the presence or absence of face detection in the face detection unit 91 and the motion direction of the object detected by the motion detection unit 92.

The first table TB1 is the same as the table TB of the first embodiment. The second table TB2 is different from the first table TB1 in that speed setting of a portion surrounded by a circle is the "medium speed" or the "low speed". The third table TB3 is different from the first table TB1 in that speed setting of a portion surrounded by a circle is the "high speed" or the "medium speed".

Figure 20:
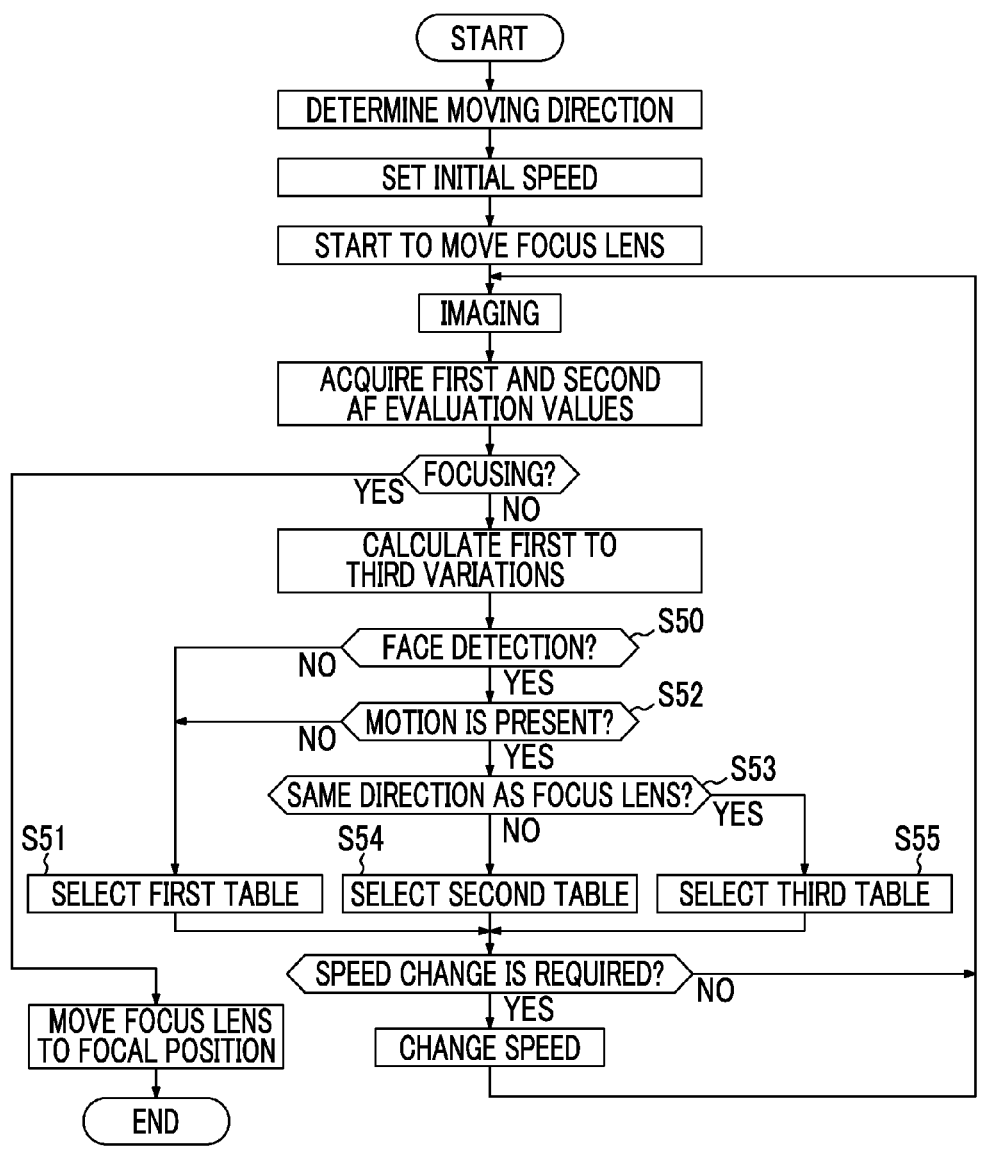
FIG. 20 is a flowchart illustrating an AF operation of the seventh embodiment.

In this embodiment, as shown in the flowchart of FIG. 20, after the AF operation starts and the first to third variations are calculated as described above, face detection is detected by the face detection unit 91 (Step S50), and when the face is not detected as the object (in Step S50, NO), the first table TB1 is selected (Step S51). When the face is detected (in Step S50, YES), motion detection of the object (face) is performed by the motion detection unit 92 (Step S52). When motion is not detected in the object (in Step S52, NO), the first table TB1 is selected (Step S51).

When motion is detected in the object, it is determined whether or not the motion direction is the same as the moving direction of the focus lens 22 (Step S53). When the motion direction is opposite to the moving direction of the focus lens 22 (in Step S53, NO), the second table TB2 is selected (Step S54). When the motion direction is the same as the moving direction of the focus lens 22 (in Step S53, YES), the third table TB3 is selected (Step S55). The subsequent steps are the same as those in the first embodiment.

When the object is moving in the optical axis direction, the focal position changes. When the motion direction of the object is opposite to the moving direction of the focus lens 22, since the focal position changes to gradually approach the focus lens 22 side, if the moving speed of the focus lens 22 is set using the same first table TB1 as in the first embodiment, the focus lens 22 moves to the vicinity of the focal position while maintaining the "high speed", and the detection accuracy of the focal position may be degraded. Conversely, when the motion direction of the object is the same as the moving direction of the focus lens 22, since the focal position changes in a direction away from the focus lens 22, the time necessary for focusing may be extended. In this embodiment, since a table having different speed setting is appropriately selected according to the presence or absence of motion of the object and the motion direction, the AF operation is performed in a short period of time and with high accuracy.

In this embodiment, although the face is detected as the object, motion of an object other than the face may be detected. The detection of the motion direction is not limited to the method based on the variation rate of the size of the object.

Eighth Embodiment

Figure 21:
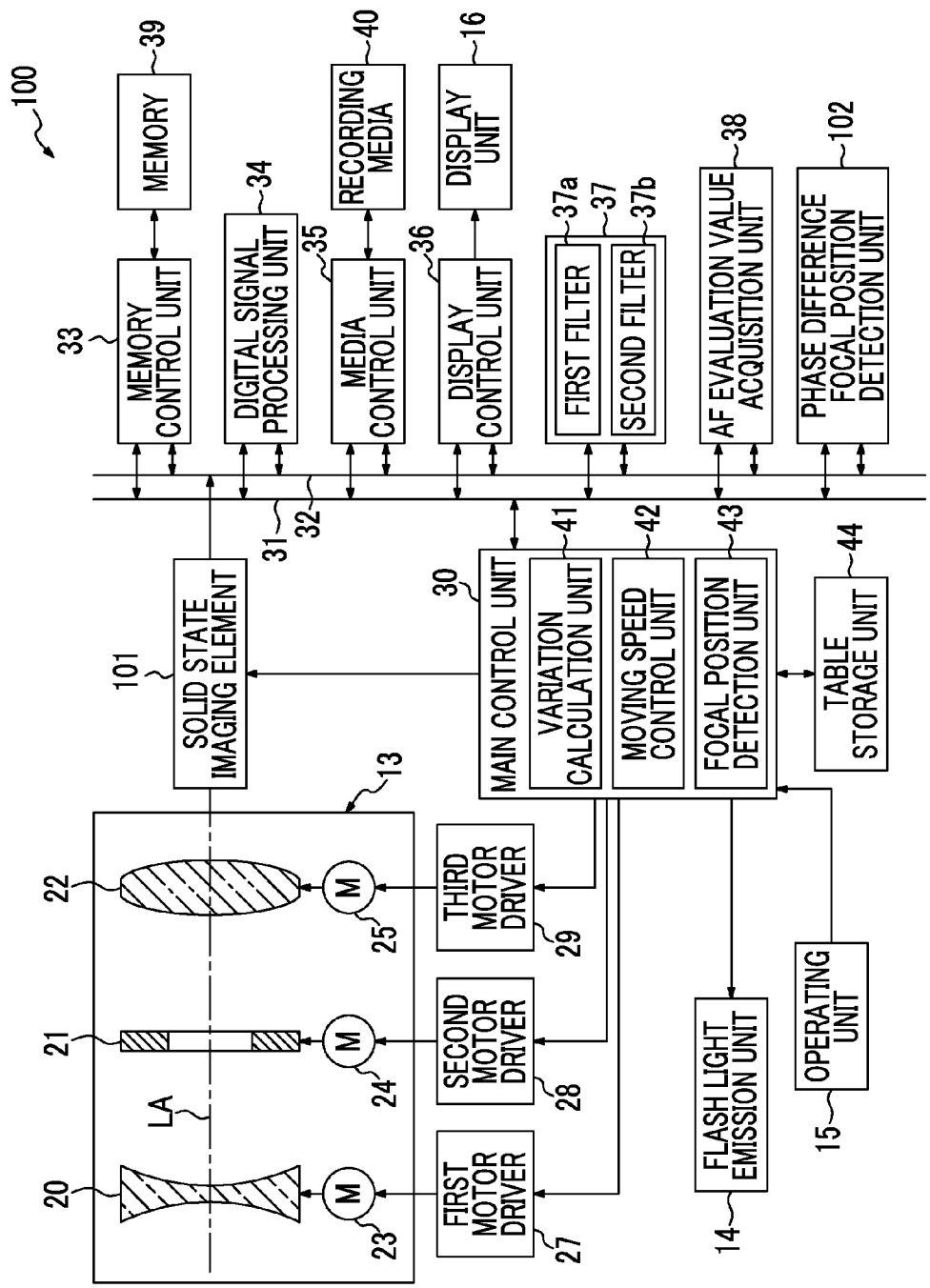
FIG. 21 is a block diagram showing the electrical configuration of a digital camera of an eighth embodiment.

In FIG. 21, a digital camera 100 of an eighth embodiment includes a solid state imaging element 101 which has a phase difference pixel, and a phase difference focal position detection unit 102. The table storage unit 44 stores the table TB shown in FIG. 5. Since other configurations are the same as those in the first embodiment, the same parts are represented by the same reference numerals, and description thereof will not be repeated.

Figure 22:
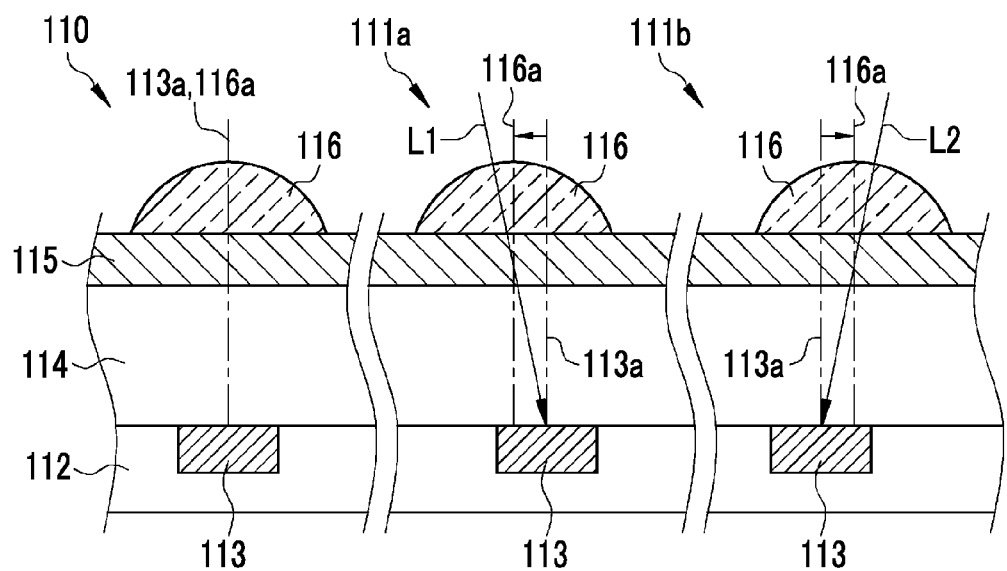
FIG. 22 is a sectional view showing the configuration of a solid state imaging element of the eighth embodiment.

As shown in FIG. 22, the solid state imaging element 101 includes a normal pixel 110, a first phase difference pixel 111a, and a second phase difference pixel 111b. Each of the pixels 110, 111a, and 111b includes a photodiode 113 which is formed on a semiconductor substrate 112, an intermediate layer 114 which is formed on the photodiode 113 and has an electrode or a wire, a color filter 115 which is formed on the intermediate layer 114, and a microlens 116 which is formed on the color filter 115.

The normal pixel 110 is configured such that a center axis 116a of the microlens 116 is substantially aligned with a center axis 113a of the photodiode 113, and does not substantially have direction dependence of light reception sensitivity. The first phase difference pixel 111a is configured such that the center axis 116a of the microlens 116 is deviated from the center axis 113a of the photodiode 113 in a left direction, and has high sensitivity to incident light L1 from a left oblique direction. Meanwhile, the second phase difference pixel 111b is configured such that the center axis 116a of the microlens 116 is deviated from the center axis 113a of the photodiode 113 in a right direction, and has high sensitivity to incident light L2 from a right oblique direction.

The first and second phase difference pixels 111a and 111b are arranged in a two-dimensional matrix along with the normal pixel 110, and constitute a light reception surface. The pixel signals of the first and second phase difference pixels 111a and 111b are subjected to gain correction, and are then used for generating image data described above with the pixel signal of the normal pixel 110.

The phase difference focal position detection unit 102 detects the focal position by determining the amount of deviation between a first image obtained by the pixel signal of the first phase difference pixel 111a and a second image obtained by the pixel signal of the second phase difference pixel 111b. The focusing detection process of the phase difference system is disclosed, for example, in JP2012-203314A.

Figure 23:
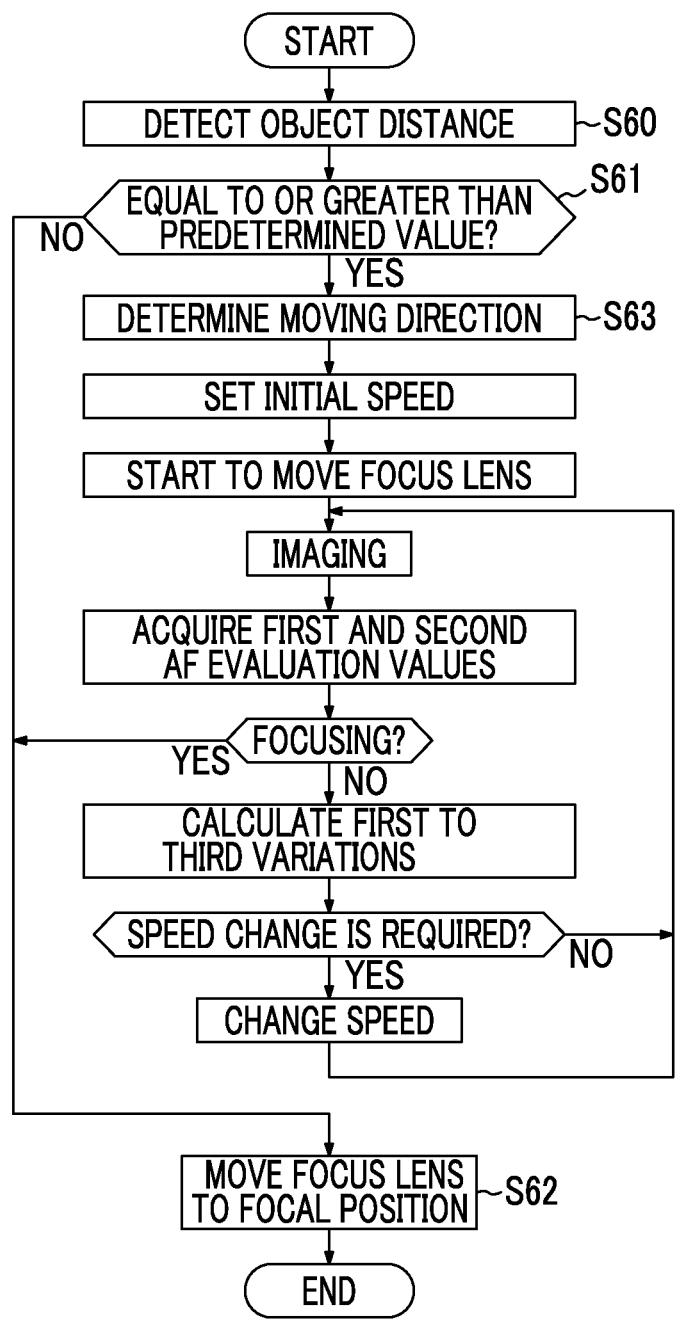
FIG. 23 is a flowchart illustrating an AF operation of the eighth embodiment.

In this embodiment, as shown in the flowchart of FIG. 23, if the AF operation starts, imaging is performed by the solid state imaging element 101, and the focal position is detected by the phase difference focal position detection unit 102 (Step S60). The main control unit 30 determines whether or not the distance (hereinafter, referred to as a focusing distance) between the current position of the focus lens 22 to the focal position is equal to or greater than a predetermined value (Step S61).

When the focusing distance is smaller than the predetermined value (in Step S61, NO), the focus lens 22 is moved to the focal position detected by the phase difference focal position detection unit 102 (Step S62), and the AF operation ends. When the focusing distance is equal to or greater than the predetermined value, as in the first embodiment, after the moving direction of the focus lens 22 is determined (Step S63), and the initial speed of the focus lens 22 is set, the AF operation of the contrast system is performed. In this embodiment, for performing the AF operation of the contrast system, since it is known that the object distance is equal to or greater than a predetermined value, the moving speed control unit 42 sets the initial speed to the "high speed".

In this embodiment, since the focal position is detected by the phase difference detection system, and when the focusing distance is smaller than the focusing distance, the detection accuracy of the focal distance detected by the phase difference detection system is comparatively high, the AF operation of the contrast system is not performed, and the focus lens 22 is moved to the focal position. When the focusing distance is equal to or greater than the predetermined value, since the detection accuracy of the focal position is low, the AF operation of the contrast system is executed. In this way, in this embodiment, it is possible to perform the AF operation in a shorter period of time and with higher accuracy.

Ninth Embodiment

Figure 24:
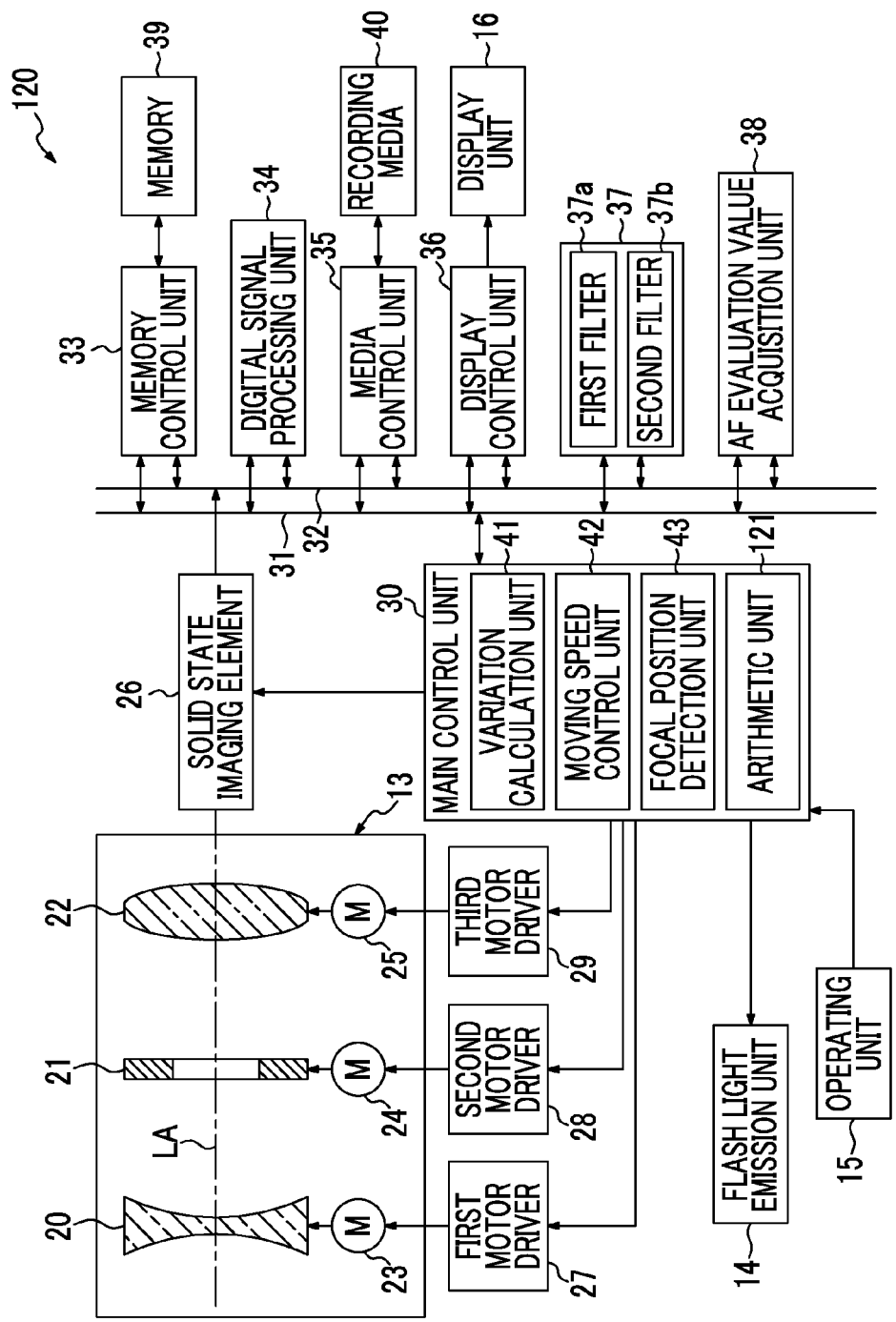
FIG. 24 is a block diagram showing the electrical configuration of a digital camera of a ninth embodiment.

In FIG. 24, a digital camera 120 of a ninth embodiment is provided with the main control unit 30 further including an arithmetic unit 121, in addition to the variation calculation unit 41, the moving speed control unit 42, and the focal position detection unit 43. In this embodiment, the table storage unit 44 is not provided. Since other configurations are the same as those in the first embodiment, the same parts are represented by the same reference numerals, and description thereof will not be repeated.

The arithmetic unit 121 performs an arithmetic operation based on Expression (7) each time the first and second AF evaluation values $E_1(x)$ and $E_2(x)$ are acquired by the AF evaluation value acquisition unit 38, and calculates an arithmetic value D(x).

$$D(x)=E_2(x)-\alpha E_1(x) \quad (7)$$

Here, the constant α (positive real number) is a value determined in advance such that the arithmetic value D(x) does not have a peak at the focal position, and has a peak at a lens position away from the focal position to some extent. Specifically, the constant α is determined such that the values of the first and second AF evaluation values $E_1(x)$ and $E_2(x)$ match each other at the focal position by imaging a chart having a specific frequency component.

In this embodiment, the variation calculation unit 41 calculates a variation V(x) corresponding to first-order differentiation of the arithmetic value D(x) based on Expression (8).

$$V(x)=\{D(x)-D(x-\Delta x)\}/\Delta x \quad (8)$$

The moving speed control unit 42 sets the moving speed of the focus lens 22 to the "high speed" when the variation V(x) is positive (V(x)>0), and sets the moving speed of the focus lens 22 to the "low speed" when the variation V(x) is negative (V(x)<0).

Figure 25:
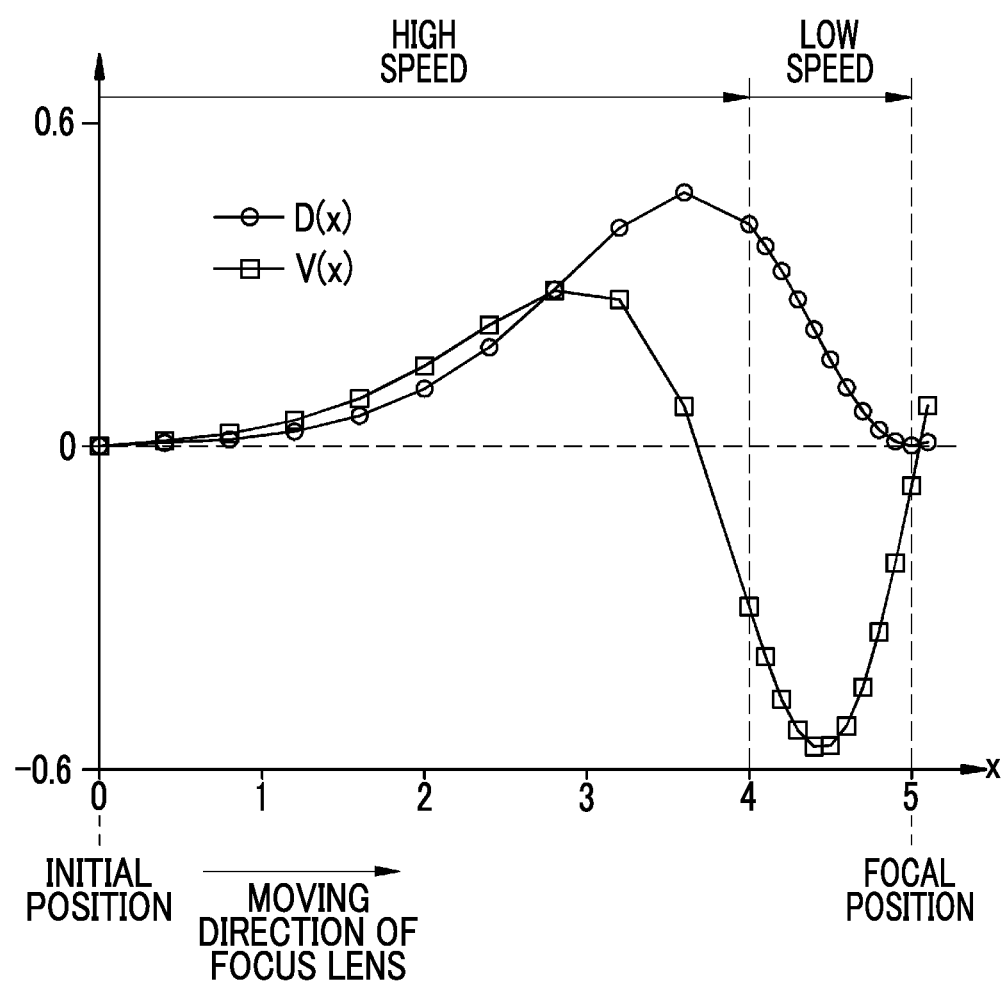
FIG. 25 is a graph showing a simulation result of an AF operation of the ninth embodiment.

FIG. 25 shows a simulation result of the AF operation of this embodiment. The arithmetic value D(x) is determined using the first and second AF evaluation values $E_1(x)$ and $E_2(x)$ shown in FIG. 7 as α=1.

In order to move the focus lens 22 from the initial position (x=0) in the positive direction of x, if the variation V(x) is calculated while increasing x from x=0, the variation V(x) becomes positive (V(x)>0). Since the variation V(x) corresponds to the "high speed", thereafter, in order to move the focus lens 22 at the high speed, x is increased by 0.4, and the variation V(x) is calculated each time x is increased.

When x=4.0, the variation V(x) is changed to negative (V(x)<0). Since the variation V(x) corresponds to the "low speed", thereafter, in order to move the focus lens 22 at the low speed, x is increased by 0.1, and the variation V(x) is calculated each time x is increased. While the variation V(x) remains negative, a peak is detected in the first and second AF evaluation values $E_1(x)$ and $E_2(x)$ when x=5.0.

In this embodiment, after the AF operation starts and before the focus lens 22 approaches the focal position, since the moving speed is changed from the high speed to the low speed, the AF operation time is reduced without deteriorating the detection accuracy of the focal position.

In this embodiment, as shown in Expression (7), although a value obtained by multiplying the first AF evaluation value $E_1(x)$ by the constant α is subtracted from the second AF evaluation value $E_2(x)$, a value obtained by adding a constant β (positive or negative real number) to the first AF evaluation value $E_1(x)$ may be subtracted from the second AF evaluation value $E_2(x)$. In this case, the constant β is a value determined in advance such that an arithmetic value F(x) does not have a peak at the focal position, and has a peak at a lens position away from the focal position to some extent. The constant β is determined such that the first and second AF evaluation values $E_1(x)$ and $E_2(x)$ match each other at the focal position by imaging a chart having a specific frequency component.

A quotient obtained by dividing the first AF evaluation value $E_1(x)$ by the second AF evaluation value $E_2(x)$ may be set as the arithmetic value $D(x)$.

Other Embodiments

In the first to eighth embodiments, although the first to third variations are calculated, and the moving speed of the focus lens 22 is controlled based on the rates of increase or decrease of the first to third variations, only the first and second variations may be calculated, and the moving speed of the focus lens 22 may be controlled based on the rates of increase or decrease of the first and second variations.

In the respective embodiments described above, although the two filters are provided in the frequency component extraction unit 37, and the two AF evaluation values are acquired by the AF evaluation value acquisition unit 38, the number of filters of the frequency component extraction unit 37 may be one, and only one AF evaluation value may be acquired. In this case, the variation calculation unit 41 may calculate at least a variation corresponding to first-order differentiation of the AF evaluation value, and the moving speed control unit 42 may control the moving speed of the focus lens 22 based on the variation. In addition, three or more filters may be provided in the frequency component extraction unit 37, and three or more AF evaluation values may be acquired.

In the respective embodiments described above, although a digital camera is illustrated as an imaging device, the invention can be applied to various apparatuses with an imaging function (imaging devices), such as a video camera, a mobile phone with a camera, and a smartphone. The respective embodiments described above can be combined with one another as long as there is no contradiction Although the present invention has been fully described by the way of the preferred embodiment thereof with reference to the accompanying drawings, various changes and modifications will be apparent to those having skill in this field. Therefore, unless otherwise these changes and modifications depart from the scope of the present invention, they should be construed as included therein.

What is claimed is:

1. A photographing apparatus comprising:
a focus lens;
a lens drive unit which moves the focus lens in an optical axis direction;
an imaging unit which images an object at an interval of a predetermined time through the focus lens moving in the optical axis direction, and generates a plurality of pieces of image data;
a frequency component extraction unit which extracts a spatial frequency component from each piece of image data using a first filter and a second filter as high pass filters, a cutoff frequency of the first filter being higher than a cutoff frequency of the second filter;
an AF evaluation value acquisition unit which integrates the spatial frequency component extracted by the first filter to acquire a first AF evaluation value, and integrates the spatial frequency component extracted by the second filter to acquire a second AF evaluation value;
an arithmetic unit which subtracts a value obtained by multiplying or adding a predetermined constant to the first AF evaluation value from the second AF evaluation value to calculate an arithmetic value, the arithmetic value being calculated as $E_2-\alpha E_1$ or $E_2-(E_1+\beta)$ where $E_1$ and $E_2$ are the first and second AF evaluation values respectively, $\alpha$ is a constant of positive real number, and $\beta$ is a constant of positive or negative real number;
a variation calculation unit which calculates a variation of the arithmetic value at an interval of the predetermined time;
a moving speed control unit which controls a moving speed of the focus lens by the lens drive unit based on the variation; and
a focal position detection unit which detects a focal position of the focus lens based on at least one of the first AF evaluation value and the second AF evaluation value.

2. A photographing apparatus comprising:
a focus lens;
a lens drive unit which moves the focus lens in an optical axis direction;
an imaging unit which images an object at an interval of a predetermined time through the focus lens moving in the optical axis direction, and generates a plurality of pieces of image data;
a frequency component extraction unit which extracts a spatial frequency component from each piece of image data using a first filter and a second filter as high pass filters, a cutoff frequency of the first filter being higher than a cutoff frequency of the second filter;
an AF evaluation value acquisition unit which integrates the spatial frequency component extracted by the first filter to acquire a first AF evaluation value, and integrates the spatial frequency component extracted by the second filter to acquire a second AF evaluation value;
a variation calculation unit which calculates at least a first variation corresponding to first-order differentiation of the first AF evaluation value and a second variation corresponding to first-order differentiation of the second AF evaluation value at an interval of the predetermined time;
a moving speed control unit which controls a moving speed of the focus lens by the lens drive unit based on the first variation and the second variation;
a focal position detection unit which detects a focal position of the focus lens based on at least one of the first AF evaluation value and the second AF evaluation value;
a difference calculation unit which calculates a difference between the first AF evaluation value and the second AF evaluation value, the difference being calculated as $|E_1-E_2|$ where $E_1$ and $E_2$ are the first and second AF evaluation values respectively; and
a table storage unit which stores a plurality of tables defining at least a correspondence relationship between rates of increase or decrease of the first and second variations and the moving speed, the correspondence relationship being different according to the difference, wherein
the moving speed control unit selects a table corresponding to the difference calculated by the difference calculation unit from among the plurality of tables, and controls the moving speed of the focus lens by the lens drive unit based on the selected table.

3. A photographing apparatus comprising:
a focus lens;
a lens drive unit which moves the focus lens in an optical axis direction;

an imaging unit which images an object at an interval of a predetermined time through the focus lens moving in the optical axis direction, and generates a plurality of pieces of image data;

a frequency component extraction unit which extracts a spatial frequency component from each piece of image data using a first filter and a second filter as high pass filters, a cutoff frequency of the first filter being higher than a cutoff frequency of the second filter;

an AF evaluation value acquisition unit which integrates the spatial frequency component extracted by the first filter to acquire a first AF evaluation value, and integrates the spatial frequency component extracted by the second filter to acquire a second AF evaluation value;

a variation calculation unit which calculates at least a first variation corresponding to first-order differentiation of the first AF evaluation value and a second variation corresponding to first-order differentiation of the second AF evaluation value at an interval of the predetermined time;

a moving speed control unit which controls a moving speed of the focus lens by the lens drive unit based on the first variation and the second variation;

a focal position detection unit which detects a focal position of the focus lens based on at least one of the first AF evaluation value and the second AF evaluation value;

a difference calculation unit which calculates a difference between the first AF evaluation value and the second AF evaluation value; and a table storage unit which stores a plurality of tables defining at least a correspondence relationship between rates of increase or decrease of the first and second variations and the moving speed, the correspondence relationship being different according to the difference, wherein the moving speed control unit selects a table corresponding to the difference calculated by the difference calculation unit from among the plurality of tables, and controls the moving speed of the focus lens by the lens drive unit based on the selected table, wherein the variation calculation unit calculates a third variation corresponding to second-order differentiation of the second AF evaluation value at an interval of the predetermined time in addition to the first and second variations, and the table storage unit stores a plurality of tables in which the rates of increase or decrease of the first to third variations are associated with the moving speed.

4. A photographing apparatus comprising:

a focus lens;

a lens drive unit which moves the focus lens in an optical axis direction;

an imaging unit which images an object at an interval of a predetermined time through the focus lens moving in the optical axis direction, and generates a plurality of pieces of image data;

a frequency component extraction unit which extracts a spatial frequency component for each filter constituting a plurality of high pass filters using the plurality of high pass filters having different cutoff frequencies from each piece of image data;

an AF evaluation value acquisition unit which integrates the spatial frequency component extracted for each filter to acquire an AF evaluation value group composed of a plurality of AF evaluation values;

a variation calculation unit which calculates a variation of a value based on the AF evaluation value group at an interval of the predetermined time;

a moving speed control unit which controls a moving speed of the focus lens by the lens drive unit based on the variation;

a focal position detection unit which detects a focal position of the focus lens based on at least one AF evaluation value of the AF evaluation value group;

a luminance detection unit which detects a luminance of the object; and a table storage unit which stores a plurality of tables defining a correspondence relationship between rates of increase or decrease of the variations and the moving speed, the correspondence relationship being different according to the luminance, wherein the moving speed control unit selects a table corresponding to the luminance detected by the luminance detection unit from among the plurality of tables, and controls the moving speed of the focus lens by the lens drive unit based on the selected table.

5. A photographing apparatus comprising:

a focus lens;

a lens drive unit which moves the focus lens in an optical axis direction;

an imaging unit which images an object at an interval of a predetermined time through the focus lens moving in the optical axis direction, and generates a plurality of pieces of image data;

a frequency component extraction unit which extracts a spatial frequency component from each piece of image data using a first filter and a second filter as high pass filters, a cutoff frequency of the first filter being higher than a cutoff frequency of the second filter;

an AF evaluation value acquisition unit which integrates the spatial frequency component extracted by the first filter to acquire a first AF evaluation value, and integrates the spatial frequency component extracted by the second filter to acquire a second AF evaluation value;

an arithmetic unit which subtracts a value obtained by multiplying or adding a predetermined constant to the first AF evaluation value from the second AF evaluation value to calculate an arithmetic value;

a variation calculation unit which calculates a variation of the arithmetic value at an interval of the predetermined time;

a moving speed control unit which controls a moving speed of the focus lens by the lens drive unit based on the variation; and a focal position detection unit which detects a focal position of the focus lens based on at least one of the first AF evaluation value and the second AF evaluation value, further comprising:

at least one pair of phase difference pixels provided in the imaging unit; and a phase difference focal position detection unit which detects the focal position with the phase difference pixels, wherein the moving speed control unit sets an initial speed for starting to move the focus lens to a predetermined value by the lens drive unit in the case where the distance between the position of the focus lens and the focal position detected by the phase difference focal position detection unit is equal to or greater than a predetermined value.

6. The photographing apparatus according claim 1, wherein each of the first filter and the second filter is a digital filter which subjects each piece of image data to a discrete cosine transformation process to extract the spatial frequency component.

* * * * *